US010385174B2

(12) United States Patent
Hirata et al.

(10) Patent No.: US 10,385,174 B2
(45) Date of Patent: Aug. 20, 2019

(54) FIBER REINFORCED THERMOPLASTIC RESIN MOLDING MATERIAL, AND FIBER REINFORCED THERMOPLASTIC RESIN MOLDED ARTICLE

(71) Applicant: Toray Industries, Inc., Tokyo (JP)

(72) Inventors: Shin Hirata, Nagoya (JP); Yuki Mitsutsuji, Nagoya (JP); Sora Bang, Nagoya (JP); Atsuki Tsuchiya, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 206 days.

(21) Appl. No.: 15/329,864

(22) PCT Filed: Jul. 30, 2015

(86) PCT No.: PCT/JP2015/071648
§ 371 (c)(1),
(2) Date: Jan. 27, 2017

(87) PCT Pub. No.: WO2016/021479
PCT Pub. Date: Feb. 11, 2016

(65) Prior Publication Data
US 2017/0260346 A1  Sep. 14, 2017

(30) Foreign Application Priority Data

Aug. 6, 2014 (JP) .................. 2014-159966

(51) Int. Cl.
*C08K 7/02* (2006.01)
*C08K 7/04* (2006.01)
*C08J 5/04* (2006.01)
*C08J 5/06* (2006.01)
*C08J 5/10* (2006.01)
*C08J 5/24* (2006.01)

(52) U.S. Cl.
CPC ................ *C08J 5/06* (2013.01); *C08J 5/042* (2013.01); *C08J 5/10* (2013.01); *C08J 5/24* (2013.01); *C08J 2323/12* (2013.01); *C08J 2323/26* (2013.01); *C08J 2369/00* (2013.01); *C08J 2377/02* (2013.01); *C08J 2463/02* (2013.01); *C08J 2477/00* (2013.01); *C08J 2491/06* (2013.01)

(58) Field of Classification Search
None
See application file for complete search history.

(56) References Cited

U.S. PATENT DOCUMENTS

| | | | | |
|---|---|---|---|---|
| 2005/0032961 A1* | 2/2005 | Oguni | ...................... | C08F 8/00 524/442 |
| 2008/0262151 A1* | 10/2008 | Ishii | ........................ | C08L 67/04 524/599 |
| 2009/0136774 A1* | 5/2009 | Onogi | ..................... | B32B 27/08 428/516 |
| 2009/0306275 A1* | 12/2009 | Inagaki | ................... | C08L 69/00 524/508 |
| 2010/0227963 A1 | 9/2010 | Hironaka et al. | | |
| 2012/0028047 A1 | 2/2012 | Imai et al. | | |
| 2014/0058022 A1* | 2/2014 | Sawai | .................... | C08K 5/005 524/120 |
| 2015/0291789 A1 | 10/2015 | Hirata et al. | | |
| 2016/0160044 A1* | 6/2016 | Kanaya | ................... | C08L 67/00 523/351 |

FOREIGN PATENT DOCUMENTS

| | | | |
|---|---|---|---|
| CN | 101374910 | 2/2009 | |
| EP | 0 872 521 | 10/1998 | |
| JP | 45-3368 | 2/1970 | |
| JP | 52-012240 A | 1/1977 | |
| JP | 61-007332 A | 1/1986 | |
| JP | 07-238213 A | 9/1995 | |
| JP | 2002-129003 | 5/2002 | |
| JP | 2002-129027 A | 5/2002 | |
| JP | 2002-327108 A | 11/2002 | |
| JP | 2005-256226 A | 9/2005 | |
| JP | 2006-052411 A | 2/2006 | |
| JP | 2006-241623 A | 9/2006 | |
| JP | 2007-031611 A | 2/2007 | |
| JP | 2008-007647 | 1/2008 | |
| JP | 2008-038003 A | 2/2008 | |
| JP | 2011-016909 A | 1/2011 | |
| JP | 2011016909 A * | 1/2011 | .............. C08L 23/10 |
| JP | 2012-056232 A | 3/2012 | |
| JP | 2013-166922 A | 8/2013 | |
| JP | 2013-177560 A | 9/2013 | |
| WO | 2007/116973 A1 | 10/2007 | |
| WO | 2009/080281 | 7/2009 | |
| WO | 2014/038574 A1 | 3/2014 | |
| WO | 2014/098103 | 6/2014 | |
| WO | WO-2014208071 A1 * | 12/2014 | .............. C08L 67/00 |

OTHER PUBLICATIONS

Abstract of JP-2011016909-A (no date).*
Supplementary European Search Report dated Mar. 12, 2018, of corresponding European Application No. 15829630.1.
The First Office Action dated Dec. 8, 2017, of corresponding Chinese Application No. 201580041570.8, along with an English translation.
Notification of Reasons for Refusal dated Jul. 21, 2016 in corresponding Japanese Patent Application No. 2015-538185 w/English translation.

* cited by examiner

Primary Examiner — Michael J Feely
(74) Attorney, Agent, or Firm — DLA Piper LLP (US)

(57) ABSTRACT

A fiber reinforced thermoplastic resin molding material includes a thermoplastic resin; a resin impregnated reinforcing fiber filament obtained by impregnating reinforcing fibers with a resin having a melt viscosity at 200° C. lower than a melt viscosity of the thermoplastic resin; and a reinforcing fiber modifier having a melt viscosity at 200° C. lower than the melt viscosity of the thermoplastic resin and a difference in solubility parameter value from the thermoplastic resin equal to or larger than 1.0, the molding material including 50 to 98.9 parts by weight of the thermoplastic resin; 1 to 40 parts by weight of the reinforcing fiber; 0.1 to 10 parts by weight of the reinforcing fiber modifier; and 0.2 to 12 parts by weight of the resin relative to total 100 parts by weight of the thermoplastic resin, the reinforcing fiber, and the reinforcing fiber modifier.

3 Claims, 2 Drawing Sheets

FIBER REINFORCED THERMOPLASTIC RESIN MOLDING MATERIAL, AND FIBER REINFORCED THERMOPLASTIC RESIN MOLDED ARTICLE

TECHNICAL FIELD

This disclosure relates to a fiber reinforced thermoplastic resin molded article and a fiber reinforced thermoplastic resin molding material. More specifically, the disclosure relates to a fiber reinforced thermoplastic resin molded article that exhibits excellent impact resistance, and a fiber reinforced thermoplastic resin molding material suitable for such a fiber reinforced thermoplastic resin molded article.

BACKGROUND

Molded articles including reinforcing fibers and thermoplastic resins are light in weight and have an excellent dynamic characteristic so that they are widely used for sporting goods, aerospace applications, general industries or the like. Reinforcing fibers used for such molded articles reinforce the molded articles in various forms according to the intended use. Used as such reinforcing fibers are metal fibers such as aluminum fibers or stainless steel fibers; organic fibers such as aramid fibers or PBO (poly-p-phenylenebenzoxazole); inorganic fibers such as silicon carbide fibers, carbon fibers, or the like. Carbon fibers are suitable from the viewpoint of balance of specific strength, specific rigidity and lightness, and, among them, polyacrylonitrile (PAN)-based carbon fibers are suitably used.

Since carbon fibers have excellent specific strength and specific rigidity, a molded article reinforced by carbon fibers has an excellent mechanical characteristic. However, in the above intended use, a requirement for further weight reduction or thickness reduction is accompanied by a requirement for further improvement of the dynamic characteristic.

As a molding material having excellent fiber dispersibility, a molding material (see Japanese Patent Laid-open Publication No. 2012-56232, for example) obtained by bonding a thermoplastic resin to a composite reinforcing fiber filament has been proposed, for example. Moreover, as a fiber reinforced thermoplastic resin composition having an excellent mechanical characteristic, or more particularly an excellent impact characteristic, a polycarbonate-based resin, a rubber-containing styrene-based resin, a polycarbonate-based resin composition (see Japanese Patent Laid-open Publication No. 2008-38003, for example) composed of an acid-modified olefin compound and carbon fibers, a fiber reinforced thermoplastic resin composition (see Japanese Patent Laid-open Publication No. H07-238213, for example) obtained by blending olefinic wax and composite rubber-based graft copolymer into an aromatic polycarbonate resin composition containing reinforcing fibers, and the like have been proposed. On the other hand, as a thermoplastic resin composition having low metal corrosiveness and an excellent thermal conductivity characteristic, a thermoplastic resin composition (see Japanese Patent Laid-open Publication No. 2007-31611, for example) composed of thermoplastic resin, lubricant and the like, a thermally conductive resin material (see International Publication WO 2007/116973, for example) including thermoplastic resin and a fibrous filler and the like have been proposed.

However, all of the techniques disclosed in JP '232, JP '003, JP '213, JP '611 and WO '973 have a problem in that a molded article has insufficient impact strength. It could therefore be helpful to provide a fiber reinforced thermoplastic resin molded article having excellent impact strength, whereby breakage of reinforcing fibers is suppressed when impact is applied to the molded article.

SUMMARY

We thus provide:

(1) A fiber reinforced thermoplastic resin molding material including: a thermoplastic resin [A]; a resin impregnated reinforcing fiber filament [E] obtained by impregnating reinforcing fibers [B] with a resin [D] having melt viscosity at 200° C. lower than melt viscosity of the thermoplastic resin [A]; and a reinforcing fiber modifier [C] that has melt viscosity at 200° C. lower than the melt viscosity of the thermoplastic resin [A] and a difference in solubility parameter value from the thermoplastic resin [A] equal to or larger than 1.0, the molding material including 50 to 98.9 parts by weight of the thermoplastic resin [A]; 1 to 40 parts by weight of the reinforcing fibers [B]; 0.1 to 10 parts by weight of the reinforcing fiber modifier [C]; and 0.2 to 12 parts by weight of the resin [D] relative to total 100 parts by weight of the thermoplastic resin [A], the reinforcing fibers [B], and the reinforcing fiber modifier [C], wherein the resin impregnated reinforcing fiber filament [E] is coated with a resin composition containing the thermoplastic resin [A] and the reinforcing fiber modifier [C].

(2) A fiber reinforced thermoplastic resin molding material including: a thermoplastic resin [A]; and a resin impregnated reinforcing fiber filament [E] obtained by impregnating reinforcing fibers [B] with a reinforcing fiber modifier [C] that has melt viscosity at 200° C. lower than melt viscosity of the thermoplastic resin [A] and a difference in solubility parameter value from the thermoplastic resin [A] equal to or larger than 1.0, the molding material including 50 to 98.9 parts by weight of the thermoplastic resin [A]; 1 to 40 parts by weight of the reinforcing fibers [B]; and 0.1 to 10 parts by weight of the reinforcing fiber modifier [C] relative to total 100 parts by weight of the thermoplastic resin [A], the reinforcing fibers [B], and the reinforcing fiber modifier [C], wherein the resin impregnated reinforcing fiber filament [E] is coated with a resin composition containing the thermoplastic resin [A].

(3) A fiber reinforced thermoplastic resin molded article including a thermoplastic resin [A] and reinforcing fibers [B], wherein a number-average length of exposed parts of reinforcing fibers from a fracture surface of the molded article becomes equal to or larger than 0.1 mm when the molded article is destructed at a destruction speed of 2.9 m/sec.

(4) A fiber reinforced thermoplastic resin molded article including: a thermoplastic resin [A]; reinforcing fibers [B]; and a reinforcing fiber modifier [C] that has melt viscosity at 200° C. lower than melt viscosity of the thermoplastic resin [A] and a difference in solubility parameter value from the thermoplastic resin [A] equal to or larger than 1.0, the molded article including 50 to 98.9 parts by weight of the thermoplastic resin [A]; 1 to 40 parts by weight of the reinforcing fibers [B]; and 0.1 to 10 parts by weight of the reinforcing fiber modifier [C] relative to total 100 parts by weight of the thermoplastic resin [A], the reinforcing fibers [B], and the reinforcing fiber modifier [C], wherein a weight-average fiber length ($L_W$) of the reinforcing fibers [B] is 0.3 to 4 mm.

The fiber reinforced thermoplastic resin molded article thus has excellent impact resistance since breakage of reinforcing fibers when impact is applied to the molded article is suppressed. When the reinforcing fibers have electrical conductivity, the electromagnetic wave shielding property of the molded article is dramatically improved. The fiber reinforced thermoplastic resin molded article is extremely useful for various components and members such as a component, an internal member and a housing of electrical and electric equipment, OA equipment, household electrical appliance, an automobile or the like.

DESCRIPTION OF REFERENCE SIGNS

Figure 1:
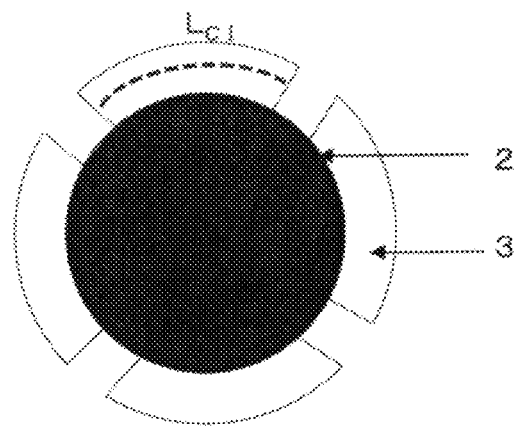
FIG. 1 is a schematic diagram illustrating an adhesion state of a reinforcing fiber modifier [C] to a surface of a reinforcing fiber [B].

1: Thermoplastic Resin [A]
2: Reinforcing Fiber [B]
3: Reinforcing Fiber Modifier [C]
4: (Black Part): Reinforcing Fiber [B]
5: (White Part): Reinforcing Fiber Modifier [C] and/or Resin [D]
6: Resin Impregnated Reinforcing Fiber Filament [E]

DETAILED DESCRIPTION

The fiber reinforced thermoplastic resin molded article (which will be hereinafter sometimes referred to as "molded article") includes a thermoplastic resin [A] and reinforcing fibers [B]. The molded article preferably further includes a reinforcing fiber modifier [C] which has melt viscosity at 200° C. lower than melt viscosity of the thermoplastic resin [A].

Regarding the molded article, a number-average length (which will be sometimes referred to as "exposed fiber length ($L_B$)") of exposed parts of the reinforcing fibers [B] exposed from a fracture surface of the molded article preferably becomes equal to or larger than 0.1 mm when the molded article is destructed at a destruction speed of 2.9 m/sec. The exposed fiber length ($L_B$) is an index indicating the length of the reinforcing fibers [B] pulled out from the fracture surface of the molded article without being fractured when impact is applied to the molded article. When $L_B$ is equal to or lager than 0.1 mm, pulling out of the reinforcing fibers [B] can increase the energy absorption amount and, therefore the impact strength of the molded article is improved. The $L_B$ is more preferably equal to or larger than 0.2 mm, and is further preferably equal to or larger than 0.3 mm. Although the exposed fiber length ($L_B$) from the fracture surface of the molded article is affected by a destruction speed, it is to be noted that we focused on an exposed fiber length ($L_B$) at a destruction speed of 2.9 m/sec.

The exposed fiber length ($L_B$) can be measured by the following method. First, a molded article is destructed by applying impact on the molded article at a destruction speed of 2.9 m/sec. Next, a fracture surface of the destructed molded article is observed with an optical microscope (50 to 1,000 times). The lengths of 1,000 reinforcing fibers [B] randomly selected from reinforcing fibers [B] exposed from the fracture surface of the molded article are each measured, and the number-average value thereof is regarded as the exposed fiber length ($L_B$). When the fracture surface of the molded article is not a flat face, it is to be noted that a fracture surface is specified for each selected reinforcing fiber [B] and the exposed fiber length ($L_B$) is calculated.

It is preferable to use a fiber reinforced thermoplastic resin molding material, which will be described later, to set the exposed fiber length ($L_B$) in the molded article within the above range. When the fiber reinforced thermoplastic resin molding material is used, it is possible to suppress fiber break of the reinforcing fibers [B] at the time of injection molding as will be described later. Moreover, use of fibers having high fracture elongation as the reinforcing fibers [B], adjustment of molding conditions or the like is also preferable to set the exposed fiber length ($L_B$) in the molded article within the above range. In injection molding, examples of molding conditions include a pressure condition such as backpressure or holding pressure, a time condition such as injection time or pressure holding time, and a temperature condition such as cylinder temperature or mold temperature.

Regarding the molded article, a weight-average fiber length ($L_W$) of the reinforcing fibers [B] existing inside the molded article is preferably 0.1 to 4 mm. When impact is applied to the molded article, a crack generated inside the molded article progresses while making a detour around reinforcing fibers, peeling an interface between reinforcing fibers and thermoplastic resins, or fracturing or pulling out reinforcing fibers. At this time, since fracturing or pulling out of reinforcing fibers causes much energy absorption, we believe that a higher possibility of occurrence of fracturing or pulling out of reinforcing fibers during crack progress leads to improvement of the impact strength of the molded article. Since longer reinforcing fibers existing inside the molded article lower the possibility of making a detour around reinforcing fibers during crack progress, the possibility of occurrence of fracturing or pulling out of reinforcing fibers is easily generated, and friction at the time of pulling out increases. Accordingly, we believe that longer reinforcing fibers can improve the impact strength of the molded article. The impact strength of the molded article is further improved when the weight-average fiber length ($L_W$) of the reinforcing fibers [B] existing inside the molded article is equal to or larger than 0.1 mm. The $L_W$ is preferably equal to or larger than 0.3 mm, and is more preferably equal to or larger than 0.5 mm. On the other hand, when the weight-average fiber length ($L_W$) is equal to or smaller than 4 mm, entanglement between single yarns of reinforcing fibers [B] is suppressed and dispersibility of the reinforcing fibers [B] is further improved and, therefore, the impact strength of the molded article is further improved. The $L_W$ is more preferably equal to or smaller than 2.5 mm. "Weight-average fiber length" does not mean a simple number average, but means an average fiber length calculated from the following formula, which considers contribution of a fiber length, after applying a weight-average molecular weight calculation method to calculation of a fiber length. However, the following formula is applied when the fiber diameter and density of the reinforcing fibers [B] are constant:

Weight-Average Fiber Length=$\Sigma(Mi^2 \times Ni)/\Sigma(Mi \times Ni)$

Mi: fiber length (mm)
Ni: the number of reinforcing fibers having a fiber length Mi.

The weight-average fiber length can be measured by the following method. The molded article is sandwiched between glass plates, is placed on a hot stage at a temperature of 200 to 300° C. in the sandwiched state, and is heat-melted to obtain a film wherein the reinforcing fibers [B] are homogeneously dispersed. Such a film is observed with an optical microscope (50 to 200 times). The fiber lengths of 1,000 randomly-selected reinforcing fibers [B] are measured, and the weight-average fiber length ($L_W$) is calculated using the above formula.

The weight-average fiber length ($L_W$) of the reinforcing fibers [B] in the molded article can be adjusted by the type of the reinforcing fibers [B], which will be described later, molding conditions or the like, for example. In injection molding, examples of molding conditions include a pressure condition such as backpressure or holding pressure, a time condition such as injection time or pressure holding time, and a temperature condition such as cylinder temperature or mold temperature.

Next, the constituent ingredients of the molded article will be described in detail.

The thermoplastic resin [A] is preferably obtained at a molding temperature (melting temperature) of 200 to 450° C. Specific examples thereof include polyolefin resins, polystyrene resins, polyamide resins, vinyl halide resins, polyacetal resins, saturated polyester resins, polycarbonate resins, polyarylsulfone resins, polyarylketone resins, polyarylene ether resins, polyarylene sulfide resins, polyaryl ether ketone resins, polyethersulfone resins, polyarylene sulfide sulfone resins, polyarylate resins, liquid crystalline polyesters and fluororesins. All of them correspond to electrical insulators. Two or more types thereof can also be used. A terminal group of these resins may be sealed or modified.

For use in electrical and electric equipment or automobile components, a resin selected from a polyolefin resin, a polyamide resin, a polycarbonate resin and a polyarylene sulfide resin, which are light in weight and have excellent balance between the dynamic characteristic and the moldability, are more preferable among the above thermoplastic resins. A polypropylene resin is preferable as the polyolefin resin.

A non-modified polypropylene resin may be employed, or a modified polypropylene resin may be employed.

Specific examples of the non-modified polypropylene resin include homopolymer of propylene, and copolymer of propylene and at least one type of monomer selected from α-olefin, conjugated diene, nonconjugated diene and other thermoplastic monomers. Examples of the copolymer may include random copolymer and block copolymer. Examples of the α-olefin include α-olefins with 2 to 12 carbon atoms excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, and 1-dodecene. Examples of the conjugated diene or the non-conjugated diene include butadiene, ethylidene norbornene, dicyclopentadiene, and 1,5-hexadiene. Two or more types thereof may be used. Suitable examples thereof include polypropylene, ethylene-propylene copolymer, propylene-1-butene copolymer and ethylene-propylene-1-butene copolymer. A propylene homopolymer is preferable from the viewpoint of improving the rigidity of the molded article. A random copolymer or a block copolymer of propylene and at least one type of monomer selected from α-olefin, conjugated diene, nonconjugated diene and the like is preferable from the viewpoint of further improving the impact strength of the molded article.

As the modified polypropylene resin, an acid-modified polypropylene resin is preferable, and an acid-modified polypropylene resin having carboxylic acid groups or carboxylate groups bonded to the polymer chain is more preferable. The above acid-modified polypropylene resin can be obtained by various methods. For example, the acid-modified polypropylene resin can be obtained by graft-polymerizing monomer, which has a neutralized or non-neutralized carboxylic acid group, and/or monomer, which has a saponified or non-saponified carboxylic acid ester group, with a non-modified polypropylene resin.

Examples of the monomer, which has a neutralized or non-neutralized carboxylic acid group, or the monomer, which has a saponified or non-saponified carboxylic acid ester group, include ethylene-based unsaturated carboxylic acid, anhydride thereof, and ethylene-based unsaturated carboxylic acid ester.

Illustrations of the ethylene-based unsaturated carboxylic acid include (meth)acrylic acid, maleic acid, fumaric acid, tetrahydrophthalic acid, itaconic acid, citraconic acid, crotonic acid and isocrotonic acid. Illustrations of the anhydride thereof include nadic acid TM (end-cis-bicyclo[2.2.1]hept-5-ene-2,3-dicarboxylic acid), maleic anhydride and citraconic anhydride.

Examples of the ethylene-based unsaturated carboxylic acid ester include (meth)acrylic esters such as methyl (meth)acrylate, ethyl (meth)acrylate, propyl (meth)acrylate, n-butyl (meth)acrylate, iso-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isoboronyl (meth)acrylate, dicyclopentanyl (meth)acrylate, dicyclopentenyl (meth)acrylate, dimethyl aminoethyl (meth)acrylate, and diethylaminoethyl (meth)acrylate; hydroxyl group-containing (meth)acrylic esters such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate, and 2-hydroxy-3-phenoxypropyl acrylate; epoxy group-containing (meth)acrylic esters such as glycidyl (meth)acrylate and methylglycidyl (meth)acrylate; and aminoalkyl (meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate, and N,N-dihydroxyethylaminoethyl (meth)acrylate.

Two or more types thereof can be used. Among them, acid hydrides of the ethylene-based unsaturated carbonic acid are preferable, and maleic anhydride is further preferable.

It is preferable to use the non-modified polypropylene resin and the modified polypropylene resin together to improve the dynamic characteristic of the molded article. Especially, the non-modified polypropylene resin and the modified polypropylene resin are preferably used in a weight ratio of 95/5 to 75/25 from the viewpoint of balance between the flame resistance and the dynamic characteristic. The weight ratio is more preferably 95/5 to 80/20, and is further preferably 90/10 to 80/20.

Polyamide resins are resins containing amino acid, lactam or diamine and dicarboxylic acid as principal raw materials. Examples of the principal raw materials include amino acids such as 6-aminocaproic acid, 11-aminoundecanoic acid, 12-aminododecanoic acid, and para-amino methylbenzoic acid; lactams such as ε-caprolactam and ω-laurolactam; aliphatic diamines such as tetramethylenediamine, hexamethylenediamine, 2-methylpentamethylene diamine, nonamethylene diamine, undecamethylene diamine, dodecamethylene diamine, 2,2,4-/2,4,4-trimethylhexamethylene diamine, and 5-methylnonamethylene diamine; aromatic diamines such as meta-xylylene diamine and para-xylylene diamine; alicyclic diamines such as 1,3-bis(aminomethyl) cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl) methane, 2,2-bis(4-aminocyclohexyl)propane, bis (aminopropyl)piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methyl terephthalate, 5-methyl isophthalate, 5-sodium sulfoisophthalate, hexahydroterephthalic acid, and hexahydroisophthalic acid; and alicyclic dicarboxylic acids such as 1,4-cyclohexanedicarboxylic acid, 1,3-cyclohexanedicarboxylic acid, and 1,2-cyclohexanedicarboxylic acid. Two or more types thereof may be used.

Polyamide resins having a melting point equal to or higher than 200° C. are especially useful in terms of excellent heat resistance and strength. Specific examples thereof include polycaproamide (nylon 6), polyhexamethylene adipamide (nylon 66), polycaproamide/polyhexamethylene adipamide copolymer (nylon 6/66), polytetramethylene adipamide (nylon 46), polyhexamethylene sebacamide (nylon 610), polyhexamethylene dodecamide (nylon 612), polyhexamethylene terephthalamide/polycaproamide copolymer (nylon 6T/6), polyhexamethylene adipamide/polyhexamethylene terephthalamide copolymer (nylon 66/6T), polylaurylamide/polyhexamethylene terephthalamide copolymer (nylon 12/6T), polyhexamethylene adipamide/ polyhexamethylene isophthal amide copolymer (nylon 66/6I), polyhexamethylene adipamide/polyhexamethylene terephthalamide/polyhexamethylene isophthalamide copolymer (nylon 66/6T/6I), polyhexamethylene adipamide/ polyhexamethylene isophthalamide/polycaproamide copolymer (nylon 66/6I/6), polyhexamethylene terephthalamide/ polyhexamethylene isophthalamide copolymer (nylon 6T/6I), polyhexamethylene terephthalamide/polydodecane amide copolymer (nylon 6T/12), polyhexamethylene terephthalami de/poly(2-methylpentamethylene)terephthalamide copolymer (nylon 6T/M5T), polymethaxylylene adipamide (nylon MXD6), polynonamethylene terephthalamide (nylon 9T) and copolymers thereof. Two or more types thereof may be used.

Although the polymerization degree of the polyamide resin is not especially limited, a sulfuric acid relative viscosity $\eta_r$ of solution, which is obtained by dissolving 0.25 g of the polyamide resin in 25 ml of 98% concentrated sulfuric acid, measured at 25° C. is preferably 1.5 to 5.0, and is more preferably 2.0 to 3.5 since excellent fluidity at the time of molding is obtained and a thin molded article is obtained easily. The sulfuric acid relative viscosity $\eta_r$ is expressed by a ratio of the flow-down speed measured using an Ostwald viscometer in a thermostatic tank at 25° C., of 98% sulfuric acid solution having a resin concentration of 1 g/100 ml to the flow-down speed of 98% sulfuric acid measured in a similar manner.

Polycarbonate resins are obtained by reacting dihydric phenols with a carbonate precursor. Polycarbonate resins may also be copolymers to be obtained using two or more types of dihydric phenols or two or more types of carbonate precursors. Examples of a reaction method may include interfacial polymerization method, melt transesterification method, solid phase transesterification method of carbonate prepolymer, and ring-opening polymerization method of a cyclic carbonate compound. For example, a known polycarbonate resin described in Japanese Patent Laid-open Publication No. 2002-129027 can be used.

Examples of the dihydric phenols include 1,1-bis(4-hydroxyphenyl)-3,3,5-trimethylcyclohexane, bis(4-hydroxyphenyl)alkane (bisphenol A or the like), 2,2-bis{(4-hydroxy-3-methyl)phenyl}propane, α,α'-bis(4-hydroxyphenyl)-m-diisopropylbenzene, and 9,9-bis(4-hydroxy-3-methylphenyl)fluorene. Two or more types thereof may be used. Among them, bisphenol A is preferable, and a polycarbonate resin having further excellent impact strength can be obtained. On the other hand, a copolymer to be obtained using bisphenol A and other dihydric phenols is excellent in terms of high heat resistance and low water absorption rate.

Examples of the carbonate precursor include carbonyl halide, carbonic diester, and haloformate. Specific examples thereof include phosgene, diphenyl carbonate, and dihaloformates of dihydric phenols.

To manufacture the polycarbonate resin from the dihydric phenols and the carbonate precursor, a catalyst, a chain-end terminator, an antioxidant which prevents oxidation of dihydric phenols and the like may be used, if necessary.

Moreover, the polycarbonate resin may be a branched polycarbonate resin obtained by copolymerizing multifunctional aromatic compounds having tri- or more function, or may be a polyester carbonate resin obtained by copolymerizing aromatic or aliphatic (including alicyclic) bifunctional carboxylic acids, or may be a copolymerized polycarbonate resin obtained by copolymerizing bifunctional aliphatic (including alicyclic) alcohols, or may be a polyester carbonate resin obtained by copolymerizing a bifunctional carboxylic acid and a bifunctional aliphatic alcohol. Moreover, two or more types of these polycarbonate resins may be used.

Although the molecular weight of the polycarbonate resin is not limited, the viscosity-average molecular weight is preferably 10,000 to 50,000. When the viscosity-average molecular weight is equal to or larger than 10,000, the strength of the molded article can be further improved. The viscosity-average molecular weight is more preferably equal to or larger than 15,000, and is further preferably equal to or larger than 18,000. On the other hand, when the viscosity-average molecular weight is equal to or smaller than 50,000, the moldability is improved. The viscosity-average molecular weight is more preferably equal to or smaller than 40,000, and is further preferably equal to or smaller than 30,000. When two or more types of the polycarbonate resins are used, the viscosity-average molecular weight of at least one type of the polycarbonate resin is preferably within the above range. In the case, other polycarbonate resins having a viscosity-average molecular weight of larger than 50,000, and preferably larger than 80,000 are preferably used. Such polycarbonate resins have high entropy elasticity, are advantageous when gas assist molding or the like is used in combination, and exhibit characteristics deriving from high entropy elasticity (drip preventing characteristic, drawdown characteristic, and characteristic which improves melting characteristic such as jetting improvement).

The viscosity-average molecular weight (M) of the polycarbonate resin is obtained by inserting specific viscosity (ηsp), which is determined at 20° C. from a solution containing 0.7 g of the polycarbonate resin dissolved in 100 ml of methylene chloride, into the following formula:

$\eta_{sp}/C=[\eta]+0.45\times[\eta]^2$ ([η] indicates limiting viscosity)

$[\eta]=1.23\times10^{-4}\times M^{0.83}$ $C=0.7$.

Although the melt viscosity of the polycarbonate resin is not limited, the melt viscosity at 200° C. is preferably from 10 to 25,000 Pa·s. When the melt viscosity at 200° C. is equal to or larger than 10 Pa·s, the strength of the molded article can be further improved. The melt viscosity is more preferably equal to or larger than 20 Pa·s, and further preferably equal to or larger than 50 Pa·s. On the other hand, when the melt viscosity at 200° C. is equal to or smaller than 25,000 Pa·s, the moldability is improved. The melt viscosity is more preferably equal to or smaller than 20,000 Pa·s, and is further preferably equal to or smaller than 15,000 Pa·s.

Commercially available products such as "Iupilon (Registered Trademark)" or "NOVAREX (Registered Trademark)" manufactured by Mitsubishi Engineering-Plastics Corporation, "Panlite (Registered Trademark)" manufactured by Teijin Chemicals Ltd., and "TARFLON (Registered Trademark)" manufactured by Idemitsu Petrochemical Co., Ltd. can be used as the polycarbonate resin.

Examples of the polyarylene sulfide resin include polyphenylene sulfide (PPS) resins, polyphenylene sulfide sulfone resins, polyphenylene sulfide ketone resins, and random and block copolymers thereof. Two or more types thereof may be used. Among them, polyphenylene sulfide resins are used especially preferably.

The polyarylene sulfide resins can be manufactured by any method such as a method of obtaining a polymer having relatively small molecular weight described in Japanese Examined Patent Publication No. S45-3368, or a method of obtaining a polymer having relatively large molecular weight described in Japanese Examined Patent Publication No. S52-12240 or Japanese Patent Laid-open Publication No. S61-7332.

The obtained polyarylene sulfide resin may be subjected to various treatments such as crosslinking/molecular weight increase by heating in air, heat treatment under decompression or in an inert gas atmosphere such as nitrogen, cleaning with an organic solvent, hot water, acid aqueous solution or the like, or activation by a functional group-containing compound such as acid anhydride, amine, isocyanate or a functional group-containing disulfide compound.

Illustrations of the method of crosslinking/molecular weight increase of the polyarylene sulfide resin by heating include a method of heating the polyarylene sulfide resin at a predetermined temperature in a heating container under an oxidizing gas atmosphere such as air or oxygen or under a mixed gas atmosphere of the oxidizing gas and an inert gas such as nitrogen or argon until desired melt viscosity is obtained. The heat treatment temperature is preferably at 200 to 270° C., and the heat treatment time is preferably 2 to 50 hours. The viscosity of the obtained polymer can be adjusted to fall within a desired range by adjusting the treatment temperature and the treatment time. Examples of a heat treatment device include a normal hot air drier, a rotary heating device, and a heating device with a stirring blade. It is preferable to use a rotary heating device or a heating device with a stirring blade from the viewpoint of achieving efficient and further homogeneous heat treatment.

In a heat treatment of the polyarylene sulfide resin under decompression or in an inert gas atmosphere such as nitrogen, the heat treatment temperature is preferably at 200 to 270° C., and the heat treatment time is preferably 2 to 50 hours. In treatment under decompression, the pressure is preferably equal to or lower than 7,000 Nm$^{-2}$. Examples of a heat treatment device include a normal hot air dryer, a rotary heating device, and a heating device with a stirring blade. It is preferable to use a rotary heating device or a heating device with a stirring blade from the viewpoint of achieving efficient and further homogeneous heat treatment.

In cleaning the polyarylene sulfide resin with an organic solvent, examples of the organic solvent include nitrogen-containing polar solvents such as N-methylpyrrolidone, dimethylformamide, and dimethylacetamide; sulfoxide/sulfone-based solvents such as dimethylsulfoxide and dimethylsulfone; ketone-based solvents such as acetone, methyl ethyl ketone, diethyl ketone, and acetophenone; ether-based solvents such as dimethyl ether, dipropyl ether, and tetrahydrofuran; halogen-based solvents such as chloroform, methylene chloride, trichloroethylene, ethylene dichloride, dichloroethane, tetrachloroethane, and chlorobenzene; alcohol and phenol-based solvents such as methanol, ethanol, propanol, butanol, pentanol, ethylene glycol, propylene glycol, phenol, cresol, and polyethylene glycol; and aromatic hydrocarbon-based solvents such as benzene, toluene, and xylene. Two or more types thereof may be used. Among these organic solvents, N-methylpyrrolidone, acetone, dimethylformamide, chloroform and the like are preferably used. Examples of the cleaning method with the organic solvent include a method of immersing the polyarylene sulfide resin in the organic solvent. If necessary, stirring or heating can be appropriately performed. The cleaning temperature to clean the polyarylene sulfide resin in the organic solvent is preferably from ordinary temperature to 150° C. It is to be noted that the polyarylene sulfide resin subjected to the organic solvent cleaning is preferably cleaned several times with water or warm water to remove the remaining organic solvent.

In cleaning the polyarylene sulfide resin with hot water, the water to be used is preferably distilled water or deionized water to exhibit a preferable effect of chemical modification of the polyarylene sulfide resin by hot water cleaning. The hot water cleaning is normally achieved by introducing a predetermined amount of the polyarylene sulfide resin into a predetermined amount of water, and heating and stirring the obtained solution under normal pressure or in a pressure container. As a ratio of the polyarylene sulfide resin and water, a bath ratio of 200 g or less of the polyarylene sulfide resin per 1 liter of water is preferably selected.

Examples of the method of acid-treating the polyarylene sulfide resin include a method of immersing the polyarylene sulfide resin in acid or an acidic aqueous solution. If necessary, stirring or heating can also be appropriately performed. Examples of the acid include aliphatic saturated monocarboxylic acids such as formic acid, acetic acid, propionic acid, and butyric acid; halo-substituted aliphatic saturated carboxylic acids such as chloroacetic acid and dichloroacetic acid, aliphatic unsaturated monocarboxylic acids such as acrylic acid and crotonic acid; aromatic carboxylic acids such as benzoic acid and salicylic acid; dicarboxylic acids such as oxalic acid, malonic acid, succinic acid, phthalic acid, and fumaric acid; and inorganic acidic compounds such as sulfuric acid, phosphoric acid, hydrochloric acid, carbonic acid, and silicic acid. Among these acids, acetic acid or hydrochloric acid is preferably used. The acid-treated polyarylene sulfide resin is preferably cleaned several times with water or warm water to remove the remaining acid or salt. The water to be used for cleaning is preferably distilled water or deionized water.

The melt viscosity of the polyarylene sulfide resin is preferably equal to or smaller than 80 Pa·s and is more preferably equal to or smaller than 20 Pa·s, under conditions of 310° C. and a shearing speed of 1000/s. Although the lower limit of the melt viscosity is not especially limited, the melt viscosity is preferably equal to or larger than 5 Pa·s. Two or more types of the polyarylene sulfide resins having different melt viscosities may be used in combination. It is to be noted that the melt viscosity can be measured under conditions of a die strength of 10 mm and a die hole diameter of 0.5 to 1.0 mm, using a Capilography (manufactured by Toyo Seiki Co., Ltd.) device.

Commercially available products such as "TORELINA (Registered Trademark)" manufactured by TORAY INDUSTRIES, INC., "DIC. PPS (Registered Trademark)" manufactured by DIC Co., Ltd., and "DURAFIDE (Registered Trademark)" manufactured by Polyplastics Co., Ltd. can be used as the polyarylene sulfide resin.

Although the reinforcing fibers [B] are not especially limited, examples of the reinforcing fibers [B] may include high-strength and high-modulus fibers such as carbon fibers, glass fibers, organic fibers such as aramid fibers, alumina fibers, silicon carbide fibers, boron fibers, and metal fibers. Two or more types thereof may be used.

The reinforcing fibers [B] can improve the dynamic characteristic of the molded article by a fiber reinforcing effect to the thermoplastic resin [A]. Furthermore, when the reinforceing fibers have unique characteristics such as electrical conductivity and thermal conductivity characteristics, the reinforcing fibers can provide these properties, which cannot be achieved by the thermoplastic resin [A] simple substance, to the molded article. Among the reinforcing fibers, carbon fibers such as PAN-based carbon fibers, pitch-based carbon fibers, and rayon-based carbon fibers are preferable from the viewpoint of a weight saving effect of the molded article and further improvement of the dynamic characteristics. PAN-based carbon fibers are further preferable from the viewpoint of balance between the strength and the modulus of the molded article to be obtained. Moreover, reinforcing fibers coated with a metal such as nickel, copper or ytterbium is also preferably used with the aim of providing electrical conductivity.

Furthermore, the carbon fibers preferably have a surface oxygen concentration ratio [O/C], which is a ratio of the atomic number of oxygen (O) and the atomic number of carbon (C) on the fiber surface measured by X-ray photoelectron spectroscopy, of 0.05 to 0.5. When the surface oxygen concentration ratio is equal to or larger than 0.05, a sufficient number of functional groups can be secured on the surface of the carbon fiber and firmer bonding with the thermoplastic resin [A] can be obtained, and therefore the strength of the molded article can be further improved. The surface oxygen concentration ratio is more preferably equal to or larger than 0.08, and is further preferably equal to or larger than 0.1. On the other hand, although the upper limit of the surface oxygen concentration ratio is not especially limited, the surface oxygen concentration ratio is preferably equal to or smaller than 0.5, is more preferably equal to or smaller than 0.4, and is further preferably equal to or smaller than 0.3, from the viewpoint of balance between handleability and productivity of the carbon fibers.

The surface oxygen concentration ratio of the carbon fibers is to be determined in the following procedures by X-ray photoelectron spectroscopy. First, when a sizing agent or the like adheres to the surface of the carbon fiber, the sizing agent or the like adhering to the surface of the carbon fiber is removed with a solvent. A carbon fiber filament is cut into a length of 20 mm, spread and arranged on a sample holder made of copper to obtain a measurement sample. The measurement sample is set in a sample chamber of an X-ray photoelectron spectroscopic device, the inside of the sample chamber is kept at $1\times10^{-8}$ Torr, and measurement is made using AlKα 1, 2 as an X-ray source. The kinetic energy value (K.E.) of a main peak of $C_{1s}$ is adjusted to 1202 eV as a correction value of a peak associated with electrification at the time of measurement. The $C_{1s}$ peak area is determined by drawing a straight base line as K.E. within a range of 1,191 to 1,205 eV. The $O_{1s}$ peak area is determined by drawing a straight base line as K.E. at 947 to 959 eV.

The surface oxygen concentration ratio is calculated as an atomic number ratio from the ratio of the $O_{1s}$ peak area and the $C_{1s}$ peak area using a sensitivity correction value unique to the device. When Model ES-200 manufactured by Kokusai Electric is used as the X-ray photoelectron spectroscopic device, a sensitivity correction value of 1.74 is used.

Although a means of adjusting the surface oxygen concentration ratio [O/C] to 0.05 to 0.5 is not especially limited, examples thereof may include techniques such as electrolytic oxidation treatment, chemical liquid oxidation treatment, and gas phase oxidation treatment. Among them, electrolytic oxidation treatment is preferable.

Although the average fiber diameter of the reinforcing fibers [B] is not especially limited, the average fiber diameter is preferably 1 to 20 μm, and is more preferably 3 to 15 μm, from the viewpoint of the dynamic characteristic and surface appearance of the molded article. Although the number of single fibers in a reinforcing fiber filament is not especially limited, the number of single fibers is preferably 100 to 350,000, and is more preferably 20,000 to 100,000 from the viewpoint of productivity.

The reinforcing fibers [B] may be subjected to surface treatment with the aim of improving the adhesive property of the reinforcing fibers [B] and the thermoplastic rein [A] serving as a matrix resin, or the like. Examples of the surface treatment method may include electrolytic treatment, ozone treatment, and ultraviolet treatment.

The reinforcing fibers [B] may be coated with a sizing agent with the aim of preventing fluffing of the reinforcing fibers [B] or improving the adhesive property of the reinforcing fibers [B] and the thermoplastic resin [A] serving as a matrix resin. Especially in carbon fibers, provision of a sizing agent can improve the adhesive property with the thermoplastic resin [A] and the characteristics of the molded article.

Examples of the sizing agent include epoxy resin, phenol resin, polyethylene glycol, polyurethane, polyester, emulsifier, and surfactant. Two or more types thereof may be used. The sizing agent is preferably water soluble or water dispersible. When carbon fibers are used as the reinforcing fibers [B], an epoxy resin having excellent wettability with the carbon resins is preferable, and a multifunctional epoxy resin is more preferable.

Examples of the multifunctional epoxy resin include bisphenol A epoxy resin, bisphenol F epoxy resin, aliphatic epoxy resin, and phenol novolak-type epoxy resin. Among them, an aliphatic epoxy resin, which tends to exhibit an adhesive property with a matrix resin, is preferable. The aliphatic epoxy resin has a flexible skeleton so that it tends to have a tough structure even when crosslink density is high. The aliphatic epoxy resin makes the carbon fibers be hardly peeled from the matrix resin so that the strength of the molded article can be further improved.

Examples of the multifunctional aliphatic epoxy resin include diglycidyl ether compound and polyglycidyl ether compound. Examples of the diglycidyl ether compound include ethylene glycol diglycidyl ether, polyethylene glycol diglycidyl ether, propylene glycol diglycidyl ether, polypropylene glycol diglycidyl ether, 1,4-butanediol diglycidyl ether, neopentyl glycol diglycidyl ether, polytetramethylene glycol diglycidyl ether, and polyalkylene glycol diglycidyl ether. Moreover, examples of the polyglycidyl ether compound include glycerol polyglycidyl ether, diglycerol polyglycidyl ether, polyglycerol polyglycidyl ether, sorbitol polyglycidyl ether, arabitol polyglycidyl ether, trimethylolpropane polyglycidyl ether, trimethylolpropane glycidyl ether, pentaerythritol polyglycidyl ether, and polyglycidyl ether of aliphatic polyhydric alcohol.

Among the aliphatic epoxy resins, an aliphatic epoxy resin having tri- or more function is preferable, and an aliphatic polyglycidyl ether compound having three or more glycidyl groups, which have high reactivity, is more preferable. The aliphatic polyglycidyl ether compound has good balance of flexibility, crosslink density and compatibility with a matrix resin, and can further improve the adhesive property. Among them, glycerol polyglycidyl ether, diglycerol polyglycidyl ether, polyglycerol polyglycidyl ether, polyethylene glycol glycidyl ether or polypropylene glycol glycidyl ether is further preferable.

The adhesion amount of the sizing agent is preferably 0.01 to 10% by weight in 100% by weight of a reinforcing fiber filament including the sizing agent and the reinforcing fibers [B]. When the sizing agent adhesion amount is equal to or larger than 0.01% by weight, the adhesive property with the thermoplastic resin [A] can be further improved. The sizing agent adhesion amount is more preferably equal to or larger than 0.05% by weight, and is further preferably equal to or larger than 0.1% by weight. On the other hand, when the sizing agent adhesion amount is equal to or smaller than 10% by weight, the physical property of the thermoplastic resin [A] can be maintained at a higher level. The sizing agent adhesion amount is preferably equal to or smaller than 5% by weight, and is further preferably equal to or smaller than 2% by weight.

Although a provision means of the sizing agent is not especially limited, examples thereof include a method of preparing a sizing treatment liquid by dissolving or dispersing the sizing agent in a solvent (including a dispersion medium in a case of dispersion) and providing the reinforcing fibers with the sizing treatment liquid, and then drying and vaporizing the solvent so that the solvent is removed. Examples of the method of providing the reinforcing fibers with the sizing treatment liquid include a method of immersing the reinforcing fibers in the sizing treatment liquid via a roller, a method of bringing the reinforcing fibers into contact with a roller to which the sizing treatment liquid adheres, and a method of atomizing the sizing treatment liquid and spraying the sizing treatment liquid to the reinforcing fibers. Although the provision method of the sizing treatment liquid may be any one of a batch type or a continuous type, a continuous type having higher productivity and smaller variation is preferable. In this regard, it is preferable to adjust the concentration of the sizing treatment liquid, the temperature, the yarn tension or the like so that the adhesion amount of the sizing agent to the reinforcing fibers becomes homogeneous within a proper range. Moreover, it is more preferable to excite the reinforcing fibers with ultrasonic waves at the time of providing the sizing treatment liquid.

The drying temperature and drying time are to be adjusted by the adhesion amount of the sizing agent. The drying temperature is preferably equal to or higher than 150° C. and equal to or lower than 350° C., and is more preferably equal to or higher than 180° C. and equal to or lower than 250° C., from the viewpoint of shortening the time required to complete removal and drying of the solvent to be used for the sizing treatment liquid while preventing thermal degradation of the sizing agent and preventing stiffening of the sized reinforcing fibers [B] to cause deterioration in spreadability of the filament.

Although examples of the solvent to be used for the sizing treatment liquid include water, methanol, ethanol, dimethylformamide, dimethylacetamide, and acetone, water is preferable from the viewpoint of easiness of handling and disaster prevention. Accordingly, when a water-insoluble or hardly water-soluble compound is used as the sizing agent, it is preferable to add an emulsifier or a surfactant and use the sizing agent as an aqueous dispersion. Specific examples of the emulsifier or the surfactant include anionic emulsifiers such as a styrene-maleic anhydride copolymer, an olefin-maleic anhydride copolymer, a formalin condensate of naphthalenesulfonate, and sodium polyacrylate; cationic emulsifiers such as polyethyleneimine and polyvinyl imidazoline; and nonionic emulsifiers such as a nonyl phenol ethylene oxide adduct, a polyvinyl alcohol, a polyoxyethylene ether ester copolymer, and a sorbitan ester ethyl oxide adduct. A nonionic emulsifier having small interaction, which hardly hinders the adhesive effect of a functional group included in the sizing agent, is preferable.

The molded article preferably further includes a reinforcing fiber modifier [C] having melt viscosity at 200° C. lower than melt viscosity of the thermoplastic resin [A]. The reinforcing fiber modifier [C] tends to flow in a cylinder more than the thermoplastic resin [A] at the time of molding, for example, injection molding. Moreover, by selecting a combination of the reinforcing fiber modifier [C] with the thermoplastic resin [A] or the reinforcing fibers [B] as will be described later, it becomes possible to obtain an affinity with the reinforcing fibers [B] higher than an affinity with the thermoplastic resin [A], and the reinforcing fiber modifier [C] can be localized in the vicinity of the reinforcing fibers [B] in the molding material. It therefore becomes possible to allow the reinforcing fiber modifier [C], which tends to flow, to exist between the reinforcing fibers [B] and the thermoplastic resin [A] in the molding material, and the fiber break of the reinforcing fibers [B] due to shearing stress in the cylinder at the time of injection molding can be suppressed. Moreover, since the reinforcing fiber modifier [C] exists between the reinforcing fibers [B] and the thermoplastic resin [A], pulling out of the reinforcing fibers [B] occurs in preference to fracture of the reinforcing fibers [B] at the time of fracture of the molded article, and crack progress to the reinforcing fibers [B] can be suppressed. As a result, the impact strength of the molded article can be further improved. Although a general molding temperature is 200 to 450° C. and set appropriately according to the type of the thermoplastic resin [A], we focused on melt viscosity at 200° C. as an index of fluidity of the reinforcing fiber modifier [C] at the time of molding.

Although the reinforcing fiber modifier [C] can be any compound having melt viscosity at 200° C. lower than the melt viscosity of the thermoplastic resin [A], a lubricant is preferably used as a compound which tends to exist between the reinforcing fibers [B] and the thermoplastic resin [A].

Examples of the lubricant include mineral oil, synthetic oil, higher fatty acid, higher fatty acid metal salt, higher fatty acid ester, higher fatty acid amide, higher alcohol, polyorganosiloxane, synthetic wax, polyalkylene glycol, fluorine fatty acid ester, and fluorine oil. "Higher" means that the compound includes eight or more carbon atoms. Two or more types thereof may be used. Specific examples of the higher fatty acid include capric acid, caprylic acid, lauric acid, coconut acid, myristic acid, stearic acid, and oleic acid. Examples of the higher fatty acid metal salt include zinc salt and calcium salt of the higher fatty acid. Examples of the higher fatty acid ester include stearic acid monoglyceride, sorbitan monostearate, and sorbin monopalmitate. Examples of the higher fatty acid amide include erucyl amide, stearic acid amide, ethylene bis-stearic acid amide, palmitic acid amide, oleic acid amide, and coconut acid amide. Examples of the higher alcohol include octyl alcohol, decyl alcohol lauryl alcohol, myristyl alcohol, stearyl alcohol, and cetyl alcohol. Examples of the polyorganosiloxane include silicone oil and silicone rubber. Examples of the synthetic wax include paraffin wax, olefinic wax, ketone wax, and ester wax. Examples of the polyalkylene glycol include stearic acid wax. Examples of the fluorine wax include trifluorochloroethylene and polyhexafluoropropylene glycol. Among them, olefinic wax or polyorganosiloxane is preferable. Since olefinic wax or polyorganosiloxane has high heat resistance and tends to remain in the molding material or the molded article after melt kneading process or molding process, a break suppression effect of the reinforcing fibers [B] can be further improved and the impact strength can be further improved.

As the olefinic wax, a polyolefin wax is preferable, and a polyethylene wax and/or a 1-alkene polymer (including α-olefin polymer) wax is more preferable. Widely known wax can be used as the polyethylene wax, and examples of the polyethylene wax include wax obtained by polymerizing ethylene under high temperature and pressure, wax obtained by thermally decomposing polyethylene, and wax obtained by separating and refining a low-molecular weight ingredient from polyethylene. Olefinic wax modified with various functional groups may be used.

Silicone oil is preferable as the polyorganosiloxane. Examples of the silicon oil include dimethylsilicone oil, methylphenyl silicone oil, methyl hydrogen silicone oil, cyclic dimethyl silicone oil, polyether-modified silicone oil, and higher fatty acid ester-modified silicone oil. The kinetic viscosity of silicone oil at 20° C. is preferably equal to or smaller than $1\times10^{-2}$ m$^2$/s from the viewpoint of handleability. Polyorganosiloxane modified with various functional groups may also be used.

A difference between the solubility parameter value of the reinforcing fiber modifier [C] and the solubility parameter value of the thermoplastic resin [A] is preferably equal to or larger than 1.0, is more preferably equal to or larger than 2.5, and is most preferably equal to or larger than 3.0. The solubility parameter value indicates a parameter of the solubility, and it is known that the solubility becomes larger as a solubility parameter value between two ingredients becomes smaller. Furthermore, a difference in solubility parameter value between the reinforcing fiber modifier [C] and the surface of the reinforcing fiber [B] (sizing agent when a sizing agent adheres to the surface of the reinforcing fiber [B]) is preferably smaller than the difference in solubility parameter value between the reinforcing fiber modifier [C] and the thermoplastic resin [A]. Moreover, the difference in solubility parameter value between the reinforcing fiber modifier [C] and the surface of the reinforcing fiber [B] is preferably equal to or smaller than 1.0. This makes it possible to allow the affinity of the reinforcing fiber modifier [C] with the surface of the reinforcing fiber [B] higher than with the thermoplastic resin [A]. This can localize the reinforcing fiber modifier [C] in the vicinity of the reinforcing fibers [B] in the molding material as described above, and can suppress fiber breakage of the reinforcing fibers [B] due to shearing stress at the time of molding or cracking progress to the reinforcing fibers [B] when impact is applied so that the impact strength of the molded article can be further improved. Accordingly, it is preferable to select the reinforcing fiber modifier [C] such that the difference in solubility parameter value between the reinforcing fiber modifier [C] and the thermoplastic resin [A] and the difference in solubility parameter value between the reinforcing fiber modifier [C] and the surface of the reinforcing fiber [B] (sizing agent when a sizing agent adheres to the reinforcing fiber [B]) fall within the above range.

Although a plurality of measuring methods of a solubility parameter value are known, we use a solubility parameter value determined by Fedors method (see PP. 66-67 in "SP Value Base/Application and Calculation," Mar. 31, 2005, the first edition, issuer: Akitoshi Taniguchi, publisher: JOHOKIKO Co., Ltd.).

As the reinforcing fiber modifier [C], a compound, having a structure having a low affinity with the thermoplastic resin [A] ingredient and having a functional group reactive with the surface of the reinforcing fiber [B], is preferable. Examples of the reinforcing fiber modifier [C] may include lubricants modified with various functional groups. Examples of the functional group may include carboxyl group, carboxylic acid anhydride group, epoxy group, oxazoline group, isocyanate group, ester group, amino group, and alkoxysilyl group.

Examples of a method of modifying a lubricant with the functional group may include (1) a method of reacting a lubricant with a compound which has the above functional group and a functional group reactive with the lubricant, (2) a method of copolymerizing a compound having the above functional group at the time of synthesis of a lubricant, (3) a method of mixing a lubricant, a compound having a functional group, and a radical generator under heat to cause reaction, and (4) a method of thermally oxidizing a lubricant to cause modification.

As the reinforcing fiber modifier [C], a polyolefin wax having a carboxyl group and/or a carboxylic acid anhydride group is more preferable. Especially, a copolymer of maleic anhydride and α-olefin is further preferable. The average value of the number of carbon atoms in α-olefin to be used for copolymerization is preferably 10 to 60, is more preferably 16 to 60, and is further preferably 25 to 55.

Examples of a method of introducing a carboxyl group or a carboxylic acid anhydride group into a polyolefin wax include a method of mixing, under heat, a compound such as maleic acid or maleic anhydride with a polymer such as polyethylene, a polymer of 1-alkene (including α-olefin), or a copolymer of 1-alkene (including α-olefin) and ethylene, in the presence or absence of a radical generator to cause reaction; and a method of copolymerizing maleic acid or maleic anhydride at the time of polymerizing ethylene, propylene, 1-alkene (including α-olefin) having four or more carbon atoms. Examples of the copolymerization method include a melt polymerization method and a bulk polymerization method. The latter method is more preferable in that the thermal load is low and it is easy to adjust the functional group amount.

The functional group amount of the reinforcing fiber modifier [C] is preferably equal to or larger than 0.05 meq/g. When the reinforcing fiber modifier [C] has 0.05 meq/g or more functional groups, an affinity with the reinforcing fibers [B] is improved, and the impact strength of the molded article can be further improved. The functional group amount is more preferably equal to or larger than 0.1 meq/g, and is further preferably equal to or larger than 0.5 meq/g. On the other hand, although the upper limit of the functional group amount is not especially limited, it is generally 10 meq/g or less. 1 eq (1 equivalent) means that, in a case of a carboxyl group, 1 mole of carboxyl groups exist per 1 g of a lubricant, and that, in a case of a carboxylic acid anhydride group, 0.5 moles of carboxylic acid anhydride groups exist per 1 g of a lubricant.

Although the melt viscosity at 200° C. of the reinforcing fiber modifier [C] is not especially limited as long as the melt viscosity is lower than the melt viscosity at 200° C. of the thermal plastic resin [A], a melt viscosity difference at 200° C. between the reinforcing fiber modifier [C] and the thermoplastic resin [A] is preferably equal to or lager than 10 Pa·s. When the melt viscosity difference is equal to or larger than 10 Pa·s, the reinforcing fiber modifier [C] in the molding material tends to be further localized on the surface of the reinforcing fiber [B]. The melt viscosity difference is more preferably equal to or lager than 100 Pa·s, and is further preferably equal to or larger than 1,000 Pa·s. The melt viscosity of the thermoplastic resin [A] and the melt viscosity of the reinforcing fiber modifier [C] can be determined by performing measurement under conditions of 0.5 Hz and 200° C. using a viscoelasticity measuring instrument and a parallel plate of 40 mm.

The melt viscosity at 200° C. of the reinforcing fiber modifier [C] is preferably 0.01 to 50 Pa·s. When the melt viscosity at 200° C. is equal to or larger than 0.01 Pa·s, the break starting at the reinforcing fiber modifier [C] can be further suppressed, and the impact strength of the molded article can be further improved. The melt viscosity at 200° C. is more preferably equal to or larger than 0.03 Pa·s. On the other hand, when the melt viscosity at 200° C. is equal to or smaller than 50 Pa·s, it becomes easier for the reinforcing fiber modifier [C] to move at the time of molding and the reinforcing fiber modifier [C] tends to be further localized on the surface of the reinforcing fiber [B] and, therefore, the impact strength of the molded article can be further improved. The melt viscosity at 200° C. is more preferably equal to or smaller than 40 Pa·s, and is further preferably equal to or smaller than 30 Pa·s. When the reinforcing fiber modifier [C] having a melt viscosity within the above range is a polyolefin wax having a carboxyl group and/or a carboxylic acid anhydride group, for example, a polyolefin wax having a desired melt viscosity can be selected from commercially available wax products having various melt viscosities.

The weight-average molecular weight of the reinforcing fiber modifier [C] is preferably 500 to 40,000. When the weight-average molecular weight is equal to or larger than 500, excellent kneadability with the thermoplastic resin [A] is obtained, and excellent moldability is obtained. The weight-average molecular weight is more preferably equal to or larger than 2,000. On the other hand, when the weight-average molecular weight is equal to or smaller than 40,000, it becomes easier to impregnate the reinforcing fibers [B] with the reinforcing fiber modifier [C] at the time of injection molding. The weight-average molecular weight of the reinforcing fiber modifier [C] can be measured using gel permeation chromatography (GPC).

Moreover, it is preferable that 10 to 90% of the reinforcing fiber modifier [C] adheres to the surface of the reinforcing fiber [B] (which may be hereinafter referred to as "fiber surface") existing in the molded article. When the adhesion ratio of the reinforcing fiber modifier [C] to the fiber surface is equal to or larger than 10%, a crack generated in the molded article does not progress directly to the reinforcing fiber [B] but progresses on the surface of the reinforcing fiber modifier [C] when impact is applied to the molded article. In this regard, since the affinity of the thermoplastic resin [A] with the reinforcing fiber modifier [C] is low, interfacial peeling occurs and the crack makes a detour around the reinforcing fiber [B]. As a result, the impact strength of the molded article can be further improved. The adhesion ratio is more preferably equal to or higher than 30%, and is further preferably equal to or higher than 60%. On the other hand, since the adhesion ratio of the reinforcing fiber modifier [C] to the fiber surface is equal to or lower than 90%, the effect of a coupling agent existing on the surface of the reinforcing fiber [B] can be maintained, and proper interfacial adhesion between the thermoplastic resin [A] and the reinforcing fiber [B] can be maintained. As a result, the impact strength and bending strength of the molded article can be further improved. The adhesion ratio is more preferably equal to or lower than 85%. It is to be noted that the adhesion ratio of [C] to the fiber surface can be adjusted to fall within the above range by selecting the thermoplastic resin [A] and the reinforcing fiber modifier [C] such that the affinity of the thermoplastic resin [A] with the reinforcing fiber modifier [C] lowers moderately so that the reinforcing fiber modifier [C] is preferentially localized on the fiber surface.

The adhesion ratio of the reinforcing fiber modifier [C] to the fiber surface can be observed with a transmission electron microscope (TEM). A vertical cross-section of the reinforcing fiber [B] in the molded article to the longitudinal direction of the fiber is cut out and observed with a TEM at a magnification of 40,000 times. FIG. 1 shows a schematic diagram illustrating an adhesion state of the reinforcing fiber modifier [C] to the surface of the reinforcing fiber [B] observed with a TEM. In FIG. 1, a numeral sign 2 indicates the reinforcing fiber [B], and a numeral sign 3 indicates the reinforcing fiber modifier [C].

The above adhesion ratio of the reinforcing fiber modifier [C] can be measured by the following method. Five reinforcing fibers [B] are randomly selected from the above TEM observation image. The diameter of the selected reinforcing fiber [B] (2), and an end part distance ($L_{c1}$) of the reinforcing fiber modifier [C] (3) existing on the circumferential surface of the reinforcing fiber [B], are measured. The end part distance means the length of the reinforcing fiber modifier [C] in a direction parallel to the circumferential surface of the reinforcing fiber [B]. The end part distance of the reinforcing fiber modifier [C] existing on the circumferential surface of the reinforcing fiber [B] is measured, and the adhesion ratio [%] is calculated from the following formula (1). At this time, the adhesion ratio is represented as 100% when the reinforcing fiber modifier [C] covers the entire surface of the reinforcing fiber [B] without a break. The adhesion ratio is measured for five reinforcing fibers [B] selected randomly, and the number-average value thereof is calculated.

Reinforcing Fiber Modifier Adhesion Ratio [%]={Sum Total of Respective End Part Distances ($L_{cI}$) of Reinforcing Fiber Modifier [C] Detected from TEM Cross-Section Observation/[Diameter (D) of Reinforcing Fiber [B] at Vertical Cross-Section in Longitudinal Direction of Fiber×Circular Constant (π)]}×100 (1)

Moreover, the film thickness of the reinforcing fiber modifier [C] adhering to the fiber surface in the molded article is preferably 5 to 20 nm. When the film thickness of the reinforcing fiber modifier [C] adhering to the fiber surface is equal to or larger than 5 nm, a crack generated in the molded article does not progress directly to the reinforcing fiber [B] but progresses to the surface of the reinforcing fiber modifier [C] when impact is applied to the molded article. In this regard, since the affinity of the thermoplastic resin [A] with the reinforcing fiber modifier [C] is low, interfacial peeling occurs and the crack makes a detour around the reinforcing fiber [B]. As a result, the impact strength of the molded article can be further improved. On the other hand, since the film thickness of the reinforcing fiber modifier [C] adhering to the fiber surface is equal to or smaller than 20 nm, the effect of a coupling agent existing on the surface of the reinforcing fiber [B] can also be maintained, and proper interfacial adhesion of the thermoplastic resin [A] and the reinforcing fiber [B] can be maintained. As a result, the impact strength of the molded article can be further improved. The film thickness of the reinforcing fiber modifier [C] adhering to the fiber surface can be adjusted to fall within the above range by setting the blending amount of the reinforcing fiber modifier [C] within a preferable range to be described later and selecting the thermoplastic resin [A] and the reinforcing fiber modifier [C] such that the affinity of the thermoplastic resin [A] with the reinforcing fiber modifier [C] lowers moderately so that the reinforcing fiber modifier [C] is preferentially localized on the fiber surface.

Figure 2:
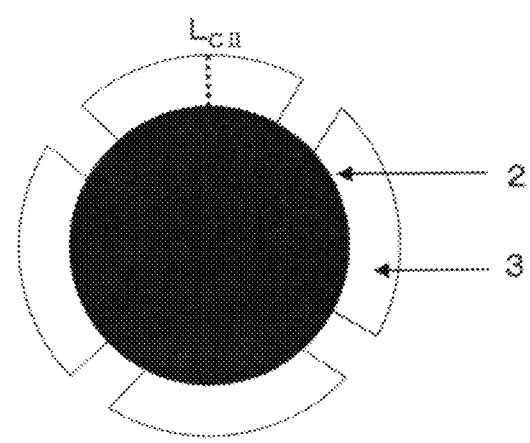
FIG. 2 is a schematic diagram illustrating a film thickness of a reinforcing fiber modifier [C] adhering to a surface of a reinforcing fiber [B].

The film thickness of the reinforcing fiber modifier [C] can be observed with a transmission electron microscope (TEM). A vertical cross-section of the reinforcing fiber [B] in the molded article to the longitudinal direction of the fiber is cut out and observed with a TEM at a magnification of 40,000 times. FIG. 2 is a schematic diagram illustrating the film thickness of the reinforcing fiber modifier [C] adhering to the surface of the reinforcing fiber [B] observed with a TEM. In FIG. 2, a numeral sign 2 indicates the reinforcing fiber [B], and a numeral sign 3 indicates the reinforcing fiber modifier [C].

The above film thickness of the reinforcing fiber modifier [C] can be measured by the following method. Five reinforcing fibers [B] are randomly selected from the above TEM observation image. The maximum film thickness ($L_{cII}$) of the reinforcing fiber modifier [C] (3) existing on the circumferential surface of the selected reinforcing fiber [B], is measured. The maximum film thickness ($L_{cII}$) is measured for the five reinforcing fibers [B] selected randomly, and the number-average value thereof is calculated.

The molded article preferably includes 50 to 98.9 parts by weight of the thermoplastic resin [A], 1 to 40 parts by weight of the reinforcing fibers [B], and 0.1 to 10 parts by weight of the reinforcing fiber modifier [C] relative to total 100 parts by weight of the thermoplastic resin [A], the reinforcing fibers [B] and the reinforcing fiber modifier [C]. The impact strength or bending strength of the molded article can be further improved since the molded article includes 1 part by weight or more of the reinforcing fibers [B], and the dispersibility of the reinforcing fibers [B] can be improved and the impact strength of the molded article can be further improved since the molded article includes 40 parts by weight or less of the reinforcing fibers [B]. Moreover, the adhesion ratio or film thickness of the reinforcing fiber modifier [C] can be easily adjusted to fall within the above preferable range since the molded article includes 0.1 to 10 parts by weight of the reinforcing fiber modifier [C]. The molded article more preferably includes 0.5 parts by weight or more of the reinforcing fiber modifier [C], and further preferably includes 1 part by weight or more of the reinforcing fiber modifier [C]. On the other hand, the molded article more preferably includes 7 parts by weight or less of the reinforcing fiber modifier [C], and further preferably includes 5 parts by weight or less of the reinforcing fiber modifier [C].

The molded article may further contain other ingredients without impairing the desired effect. Although the other ingredients are not especially limited, examples thereof include thermoplastic resins different from the thermoplastic resin [A], thermosetting resins, flame retardants, conductivity imparting agents, nucleating agents, ultraviolet absorbers, antioxidants, damping agents, antibacterial agents, mothproof agents, deodorants, coloring preventing agents, heat stabilizers, mold releasing agents, antistatic agents, plasticizers, coloring agents, pigments, dyes, foaming agents, antifoaming agents, and coupling agents. Two or more types thereof may be used. When the molded article contains elastomer or a rubber ingredient, the impact strength can be further improved. Moreover, when the molded article contains a thermoplastic resin (which may be hereinafter referred to as thermoplastic resin [F]) different from the thermoplastic resin [A], the break suppression effect of the reinforcing fibers [B] can be further improved, and the dynamic characteristics such as bending strength and impact strength of the molded article can be further improved. When the molded article contains a thermally conductive filler [G], the thermal conductivity of the molded article can be improved.

As the thermoplastic resin [F], a styrene-based resin is preferable from the viewpoint of further improving the break suppression effect of the reinforcing fibers [B]. A styrene-based resin includes aromatic vinyl-based monomers as an ingredient for polymerization, and may be a copolymer of an aromatic vinyl-based monomer with another ingredient which can be copolymerized therewith. Examples of the other ingredient include vinyl-based monomers other than the aromatic vinyl-based monomer, and a rubber ingredient. The mode of the copolymerization is not especially limited, and examples thereof include random copolymerization, alternating copolymerization, block copolymerization, and graft copolymerization. Two or more types thereof may be used in combination. The mode of the styrene-based resin may be a single styrene-based resin, or may have a so-called core shell structure formed of a styrene-based resin and another ingredient.

Specific examples of the aromatic vinyl-based monomer include styrene, α-methylstyrene, p-methyl styrene, vinyltoluene, t-butyl styrene, o-ethyl styrene, o-chlorostyrene, and o,p-dichlorostyrene. Two or more types thereof may be used. Styrene or α-methylstyrene is used especially preferably.

Moreover, it is preferable to copolymerize aromatic vinyl-based monomers and other vinyl-based monomers which can be used for copolymerization. Desired characteristics such as chemical resistance, heat resistance, and impact strength can be further improved by selecting ingredients for copolymerization. Examples of the other vinyl-based monomers which can be used for copolymerization include acrylonitrile, methacrylonitrile, ethacrylonitrile, (meth)acrylic acid, methyl (meth)acrylate, ethyl (meth)acrylate, n-propyl (meth)acrylate, n-butyl (meth)acrylate, t-butyl (meth)acrylate, n-hexyl (meth)acrylate, chloromethyl (meth)acrylate, glycidyl (meth)acrylate, maleic anhydride, itaconic anhydride, N-methylmaleimide, N-ethylmaleimide, N-cyclohexylmaleimide, and N-phenylmaleimide. Two or more types thereof may be used. Acrylonitrile is used especially preferably.

The styrene-based resin further preferably includes a rubber-modified styrene-based resin, which is a copolymer of the aromatic vinyl-based monomer and a rubber ingredient that can be used for copolymerization. Since soft segments constituted of a rubber ingredient mitigate external force applied to the reinforcing fibers [B] at the time of molding, a larger fiber break effect can be expected, and the bending strength and impact strength of the molded article can be further improved.

Examples of the rubber ingredient may include polybutadiene rubber, styrene-butadiene copolymer, hydrogenated styrene-butadiene rubber, acrylonitrile-butadiene copolymer, butyl acrylate-butadiene copolymer, and isoprene rubber. Two or more types thereof may be used. Among them, dienic rubber such as polybutadiene or styrene-butadiene copolymer is preferable.

Examples of the styrene-based resin include polystyrene (PS) resin, high impact polystyrene (HIPS) resin, styrene-acrylonitrile copolymer (AS resin), modified AS resin, acrylonitrile-acrylic ester-styrene copolymer (AAS resin), acrylonitrile-ethylene-styrene copolymer (AES resin), acrylonitrile-butadiene-styrene copolymer (ABS resin), methacrylic acid ester-butadiene-styrene copolymer (MBS resin), styrene-butadiene copolymer (SBR resin), styrene-butadiene-styrene copolymer (SBS resin), styrene-ethylene-butylene-styrene copolymer (SEBS resin), and styrene-isoprene-styrene copolymer (SIS resin). An MBS resin, an SBS resin or an SEBS resin, which is a rubber-modified styrene-based resin, is preferable from the viewpoint of further improving the break suppression effect of the reinforcing fibers [B] and further improving the impact strength of the molded article, and an SEBS resin is more preferable.

Although the SEBS resin is not especially limited, the SEBS resin is more preferably a hydrogenated block copolymer obtained by hydrogenating a styrene-butadiene block copolymer. Preferable examples of commercially available SEBS resins include Tuftec (registered trademark) manufactured by Asahi Kasei Chemicals Ltd.; SEPTON (registered trademark) manufactured by Kuraray Co. Ltd.; and KRATON (registered trademark) manufactured by Kraton Polymers Japan Ltd.

Moreover, the content of the thermoplastic resin [F] in the molded article is preferably 0.5 to 10 parts by weight relative to total 100 parts by weight of the ingredients [A] to [C]. When the content of the thermoplastic resin [F] is equal to or larger than 0.5 parts by weight, the impact strength of the molded article can be further improved. The content of the thermoplastic resin [F] is preferably equal to or larger than 1 part by weight, and is more preferably equal to or larger than 2 parts by weight. On the other hand, since the content of the thermoplastic resin [F] is equal to or smaller than 10 parts by weight, rigidity of the molded article is improved, and bending strength or bending elasticity can be further improved. The content of the thermoplastic resin [F] is more preferably equal to or smaller than 7 parts by weight, and is further preferably equal to or smaller than 5 parts by weight.

A filler having a thermal conductivity characteristic other than the reinforcing fibers [B] is selected as the thermally conductive filler [G]. Examples of a filler shape include non-fibrous shapes such as a plate shape, a scaly shape, a granular shape, an amorphous shape, and a crushed article. Specific examples of the thermally conductive filler [G] include mica, talc, kaolin, silica, calcium carbonate, glass beads, glass flakes, glass microballoons, clay, molybdenum disulfide, wollastonite, calcium polyphosphate, graphite, metal powder, metal flakes, metal ribbons, metal oxides (e.g., alumina, zinc oxide, and titanium oxide), carbon powder, graphite, carbon flakes, scaly carbon, and carbon nanotubes. Two or more types thereof may be contained. Silver, nickel, copper, zinc, aluminum, stainless steel, iron, brass, chromium, tin and the like can be illustrated as specific examples of a metal which constitutes the metal powder, metal flakes or metal ribbons.

Among them, it is preferable to use fillers having a thermal conductivity equal to or higher than 20 W/mK, from the viewpoint of further improving the thermal conductivity of the molded article. Examples of the thermally conductive filler [G] having a thermal conductivity equal to or higher than 20 W/mK include metal powder, metal flakes, and metal ribbons; metal oxides such as beryllia, alumina, zinc oxide, and magnesium oxide; metal nitrides such as aluminum nitride, boron nitride, and silicon nitride; various inorganic fillers coated with these thermally conductive substances, carbon powder, and graphite; and carbon flakes, scaly carbon, and carbon nanotubes having a relatively high graphitization degree. Although the thermal conductivity of the thermally conductive filler [G] principally indicates a value measured by a laser flash method, a value of thermal conductivity measured by a measurable method, e.g., a steady-state method in the flow direction is used when the thermal conductivity cannot be measured directly by a laser flash method such as a thermally conductive filler constituted of a carbon-based material. The measurement of the thermal conductivity by a steady-state method can be performed by cutting out a test piece having a size of 20 mm×20 mm×4 mm in thickness from an ISO dumbbell test piece, and measuring the thermal conductivity in the thickness direction at 80° C. using GH-1S manufactured by ULVAC-RIKO. This makes it possible to measure a thermal conductivity in the thickness direction of the molded article, i.e., a direction perpendicular to the flow of resin at the time of molding. Moreover, the thermal conductivity in the flow direction of resin at the time of molding can be measured by cutting out five test pieces having a size of 20 mm×4 mm×4 mm in thickness from the ISO dumbbell test piece, and measuring the thermal conductivity at 80° C. using GH-1S manufactured by ULVAC-RIKO by arranging the five test pieces horizontally with the flow direction set perpendicularly.

Among the thermally conductive fillers having a thermal conductivity equal to or higher than 20 W/mK, alumina, zinc oxide, aluminum nitride, boron nitride, silicon nitride, carbon powder, graphite, carbon flakes, scaly carbon, and carbon nanotubes are preferable from the viewpoint of the weight reduction of the molded article. Among them, graphite which has further excellent thermal conductivity and is relatively inexpensive is more preferable.

Graphite exhibits an effect of improving the thermal conductivity of the molded article. Furthermore, it is interesting that, since graphite is contained, the exposed fiber length ($L_B$) and weight-average fiber length ($L_W$) of the reinforcing fibers [B] in the molded article can be further increased, and mechanical characteristics such as bending strength and bending modulus of the molded article can be further improved. Although the reason for this cannot be asserted, it is estimated that, since graphite exists around the reinforcing fibers [B], the graphite receives and disperses shearing force at the time of molding. Accordingly, break of the reinforcing fibers [B] is suppressed, and the exposed fiber length ($L_B$) and weight-average fiber length ($L_W$) of the reinforcing fibers [B] can be further increased.

Although graphite is not especially limited, examples thereof include natural graphite and various artificial graphites. Examples of the natural graphite include earthy graphite, massive graphite, and scaly graphite. Artificial graphite is obtained as follows: amorphous carbon is heat-treated and minute graphite crystals having random array are artificially aligned; and examples of the artificial graphite include kish graphite, decomposed graphite, and thermally decomposed graphite, in addition to artificial graphite to be used for a general carbon material. The artificial graphite to be used for a general carbon material can be manufactured by graphitization treatment using petroleum coke or coal-based pitch coke as a principal raw material. Among them, scaly graphite is preferable from the viewpoint of further improving the impact characteristic and the thermal conductivity characteristic.

Moreover, the particle diameter of graphite in the molded article is preferably 10 to 100 μm. When the particle diameter of graphite included in the molded article is equal to or larger than 10 μm, thermally conductive path formation can be advanced effectively, and the thermal conductivity can be further improved. On the other hand, since the particle diameter of graphite included in the molded article is equal to or smaller than 100 μm, the external appearance of the molded article can be improved.

The particle diameter of graphite means an average value of fifty particle diameters measured by photographing a cross-section of the molded article at a magnification of 200 to 2,000 times, and selecting fifty pieces of graphite having larger particle diameters from pieces of graphite observed in the photograph. The maximum diameter is measured as a particle diameter when graphite observed in the photograph is not circular.

Examples of a method of allowing the particle diameter of graphite in the molded article to fall within the above range include a method of molding a carbon reinforced thermoplastic resin molding material provided with graphite having a particle diameter within a preferable range which will be described later.

Moreover, the content of the thermally conductive filler [G] in the molded article is preferably 1 to 40 parts by weight relative to total 100 parts by weight of the ingredients [A] to [C]. When the content of the thermally conductive filler [G] is equal to or larger than 1 part by weight, the thermal conductivity, bending strength, and bending modulus of the molded article can be further improved. The content of the thermally conductive filler [G] is preferably equal to or larger than 3 parts by weight, and is more preferably equal to or larger than 5 parts by weight. On the other hand, when the content of the thermally conductive filler [G] is equal to or smaller than 40 parts by weight, rigidity of the molded article can be suppressed moderately, and bending strength can be further improved. The content of the thermally conductive filler [G] is more preferably equal to or smaller than 35 parts by weight, and is further preferably equal to or smaller than 30 parts by weight.

Next, the fiber reinforced thermoplastic resin molding material (which may be hereinafter referred to as "molding material") will be described in detail. The "molding material" means a raw material to be used for, for example, injection-molding a molded article.

The molding material preferably has a structure in which a resin impregnated reinforcing fiber filament [E] is coated with the thermoplastic resin [A]. "Structure coated" indicates a structure in which the thermoplastic resin [A] is arranged on the surface of the resin impregnated reinforcing fiber filament [E] and both resins are bonded to each other. Moreover, the resin impregnated reinforcing fiber filament [E] is obtained by impregnating a filament of the reinforcing fibers [B] with the reinforcing fiber modifier [C] and/or a resin [D] which will be described later.

A first example of the molding material includes the thermoplastic resin [A]; and a resin impregnated reinforcing fiber filament [E] obtained by impregnating the reinforcing fiber [B] filament with the reinforcing fiber modifier [C], in which the resin impregnated reinforcing fiber filament [E] is coated with the thermoplastic resin [A] or a resin composition including the thermoplastic resin [A]. A second example of the molding material includes the thermoplastic resin [A]; a resin impregnated reinforcing fiber filament [E] obtained by impregnating the reinforcing fibers [B] with a resin [D] having melt viscosity at 200° C. lower than the melt viscosity of the thermoplastic resin [A]; and the reinforcing fiber modifier [C], in which the resin impregnated reinforcing fiber filament [E] is coated with a resin composition including the thermoplastic resin [A] and the reinforcing fiber modifier [C]. The first aspect preferably includes 50 to 98.9 parts by weight of the thermoplastic resin [A], 1 to 40 parts by weight of the reinforcing fibers [B], and 0.1 to 10 parts by weight of the reinforcing fiber modifier [C] relative to total 100 parts by weight of the thermoplastic resin [A], the reinforcing fibers [B], and the reinforcing fiber modifier [C]. The second aspect preferably includes 50 to 98.9 parts by weight of the thermoplastic resin [A], 1 to 40 parts by weight of the reinforcing fibers [B], 0.1 to 10 parts by weight of the reinforcing fiber modifier [C], and 0.2 to 12 parts by weight of the resin [D] relative to total 100 parts by weight of the thermoplastic resin [A], the reinforcing fibers [B], and the reinforcing fiber modifier [C]. When the molding material includes 0.2 to 12 parts by weight of the resin [D], the dispersibility of the reinforcing fibers [B] into the thermoplastic resin [A] at the time of injection molding can be further improved. When the molding material includes 1 part by weight or more of the reinforcing fibers [B], the impact strength or the bending strength can be further improved. Moreover, since 40 parts by weight or less of the reinforcing fibers [B] is included, the dispersibility of the reinforcing fibers [B] can be improved, and the impact strength can be further improved. The molding material more preferably includes 3 parts by weight or more, and further preferably includes 5 parts by weight or more of the reinforcing fibers [B]. On the other hand, the molding material preferably includes 30 parts by weight or less, and further preferably includes 20 parts by weight or less of the reinforcing fibers [B]. Moreover, since the molding material includes 0.1 to 10 parts by weight of the reinforcing fiber modifier [C], the adhesion ratio or film thickness of the reinforcing fiber modifier [C] can be easily adjusted to fall within the above preferable range. The molding material more preferably includes 0.5 parts by weight or more, and further preferably includes 1 part by weight or more of the reinforcing fiber modifier [C]. On the other hand, the molding material more preferably includes 7 parts by weight or less, and further preferably includes 5 parts by weight or less of the reinforcing fiber modifier [C].

Figure 3:
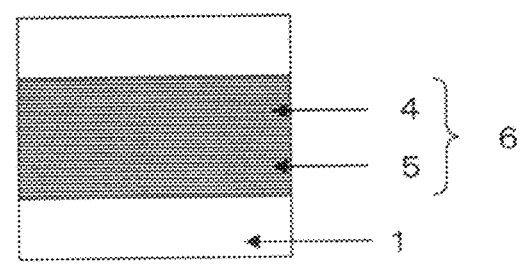
FIG. 3 is a schematic drawing illustrating an example of a preferable longitudinal cross-sectional form of a molding material.

FIG. 3 is a schematic drawing illustrating an example of a preferable longitudinal cross-sectional form of the molding material. A longitudinal cross-section means a cross-section on a plane including the axial direction of a cylinder in a cylindrical molding material. In FIG. 3, a numeral sign 1 indicates the thermoplastic resin [A], a numeral sign 4 (black part) indicates the reinforcing fibers [B], a numeral sign 5 (white part) indicates the reinforcing fiber modifier [C] and/or the rein [D] which will be described later, and a numeral sign 6 indicates the resin impregnated reinforcing fiber filament [E]. Regarding the molding material illustrated in FIG. 3, single fibers of the reinforcing fibers [B] (4) are arranged substantially parallel to the axial direction of the molding material, and the length of the reinforcing fiber [B] (4) is substantially equal to the length of the molding material.

"Arranged substantially parallel" indicates a state where the axis of the long axis of the reinforcing fiber [B] and the axis of the long axis of the molding material are oriented in the same direction. An angle formed by the axes is preferably equal to or smaller than 20°, is more preferably equal to or smaller than 10°, and is further preferably equal to or smaller than 5°. Moreover, "substantially equal to the length" indicates that the reinforcing fibers [B] are not cut intentionally inside the molding material and that reinforcing fibers [B] significantly shorter than the entire length of the molding material are not substantially included. Although the amount of the reinforcing fibers [B] shorter than the entire length of the molding material is not especially limited, the content of the reinforcing fibers [B] having a length equal to or smaller than 50% of the entire length of the molding material is preferably equal to or smaller than 30% by mass, and is more preferably equal to or smaller than 20% by mass of the whole reinforcing fibers [B]. When the reinforcing fibers [B] have a length substantially equal to the molding material, the reinforcing fiber length in the obtained molded article can be increased, and the impact strength of the molded article can be further improved. The length of each of the reinforcing fiber [B] and the molding material is preferably equal to or smaller than 10 mm, and is more preferably equal to or smaller than 8 mm. The length of each of the reinforcing fiber [B] and the molding material is preferably equal to or lager than 3 mm, and is more preferably equal to or larger than 5 mm. The molding material keeps cross-sectional shapes substantially equal to each other in the longitudinal direction, and is preferably continuous.

Figure 4:
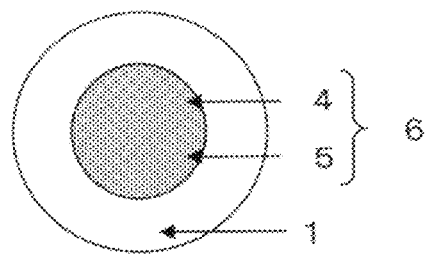
FIG. 4 is a schematic drawing illustrating an example of a preferable transverse cross-sectional form of the molding material.
Figure 5:
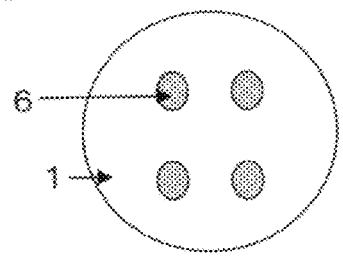
FIG. 5 is a schematic drawing illustrating an example of a preferable transverse cross-sectional form of the molding material.

Although the cross-sectional form of the molding material is not limited to the form illustrated in the figure as long as the resin impregnated reinforcing fiber filament [E] is coated with the thermoplastic resin [A], a preferable structure is such that the resin impregnated reinforcing fiber filament [E] serves as a core material and is sandwiched with the thermoplastic resin [A] to form layers as illustrated in the longitudinal cross-sectional form of FIG. 3. Moreover, a preferable structure is such that the resin impregnated reinforcing fiber filament [E] serves as a core structure and the periphery of the resin impregnated reinforcing fiber filament [E] is coated with the thermoplastic resin [A] to form a core-in-sheath structure as illustrated in the transverse cross-sectional form of FIG. 4. Moreover, when a plurality of the resin impregnated reinforcing fiber filaments [E] are arranged to be coated with the thermoplastic resin [A] as illustrated in FIG. 5, the number of the resin impregnated reinforcing fiber filaments [E] is desirably approximately 2 to 6.

The thermoplastic resin [A] may partially penetrate into a part of the resin impregnated reinforcing fiber filament [E] around the boundary between the resin impregnated reinforcing fiber filament [E] and the thermoplastic resin [A] so that the reinforcing fiber modifier [C] and/or the resin [D], which constitute the resin impregnated reinforcing fiber filament [E], are impregnated with the thermoplastic resin [A].

The compounds illustrated above can be used as the thermoplastic resin [A], the reinforcing fibers [B], and the reinforcing fiber modifier [C]. Moreover, the effect of each of the ingredients in the molding material has been explained above.

Moreover, in the molding material, the reinforcing fiber modifier [C] preferably adheres to at least a part of the surface of the reinforcing fiber [B] existing in the molding material.

The resin [D] is a compound having melt viscosity at 200° C. lower than the melt viscosity of the thermoplastic resin [A] and is different from the above-described reinforcing fiber modifier [C]. The resin [D] has roles as a so-called impregnation assistant and a dispersion assistant forming the resin impregnated reinforcing fiber filament [E] together with the reinforcing fibers [B], assists to impregnate the reinforcing fibers [B] with the thermoplastic resin [A] at the time of molding, and assists to disperse the reinforcing fibers [B] in the thermoplastic resin [A].

The melt viscosity at 200° C. of the resin [D] is preferably 0.01 to 10 Pa·s. When the melt viscosity at 200° C. is equal to or larger than 0.01 Pa·s, the break starting at the resin [D] can be further suppressed, and the impact strength of the molded article can be further improved. The melt viscosity is more preferably equal to or larger than 0.05 Pa·s, and is further preferably equal to or larger than 0.1 Pa·s. On the other hand, when the melt viscosity at 200° C. is equal to or smaller than 10 Pa·s, the inside of the reinforcing fibers [B] tends to be further impregnated with the resin [D]. For this reason, the dispersibility of the reinforcing fibers [B] at the time of molding the molding material can be further improved. The melt viscosity is more preferably equal to or smaller than 5 Pa·s, and is further preferably equal to or smaller than 2 Pa·s. The melt viscosity at 200° C. of the resin [D] can be measured with a viscoelasticity measuring instrument at 0.5 Hz using a parallel plate of 40 mm.

The resin [D] preferably has a high affinity with the thermoplastic resin [A]. By selecting the resin [D] having a high affinity with the thermoplastic resin [A], the resin [D] is efficiently compatible with the thermoplastic resin [A] at the time of manufacturing or molding the molding material, and therefore the dispersibility of the reinforcing fibers [B] can be further improved.

The resin [D] is appropriately selected according to a combination with the thermoplastic resin [A] which is a matrix resin. For example, a terpene resin is suitably used for a molding temperature at 150 to 270° C., while an epoxy resin is suitably used for a molding temperature at 270 to 320° C. Specifically, a terpene resin is preferable as the resin [D] when the thermoplastic resin [A] is a polypropylene resin. An epoxy resin is preferable as the resin [D] when the thermoplastic resin [A] is a polycarbonate resin or a polyarylene sulfide resin. A terpenephenol resin is preferable as the resin [D] when the thermoplastic resin [A] is a polyamide resin.

To impregnate the reinforcing fibers [B] with the resin [D] to obtain the resin impregnated reinforcing fiber filament [E], the melting temperature (temperature in the melting bath) at the time of supplying the resin [D] is preferably 100 to 300° C. as will be described later. Accordingly, we focused on the melt viscosity at 200° C. of the resin [D] as an index of the impregnability of the resin [D] into the reinforcing fibers [B]. When the melt viscosity at 200° C. is within the above preferable range, excellent impregnability into the reinforcing fibers [B] is obtained in such a preferable melting temperature range, and therefore the dispersibility of the reinforcing fibers [B] is further improved, and the impact strength of the molded article can be further improved.

The rate of change in melt viscosity after two hours heating at 200° C. of the resin [D] is preferably equal to or smaller than 2%. The rate of change in melt viscosity is determined by following formula (2):

(Rate of Change in Melt Viscosity [%])={|(Melt Viscosity at 200° C. after two hours heating at 200° C.–Melt Viscosity at 200° C. before two hours heating at 200° C.)|/(Melt Viscosity at 200° C. before two hours heating at 200° C.)}×100    (2).

To impregnate the reinforcing fibers [B] with the resin [D] to form the resin impregnated reinforcing fiber filament [E], the melting temperature (temperature in the melting bath) at the time of supplying the resin [D] is preferably 100 to 300° C. as will be described later. Hence, when the rate of change in melt viscosity is equal to or lower than 2%, uneven impregnation or the like can be suppressed and stable manufacturing of the resin impregnated reinforcing fiber filament [E] can be secured even when the resin impregnated reinforcing fiber filament [E] is manufactured for a long time. The rate of change in melt viscosity is more preferably equal to or lower than 1.5%, and is further preferably equal to or lower than 1.3%.

The rate of change in melt viscosity of the resin [D] can be determined by the following method. First, the melt viscosity at 200° C. is measured by a viscoelasticity measuring instrument at 0.5 Hz using a parallel plate of 40 mm. Next, the resin [D] is placed still for two hours in a hot air drier at 200° C., and then the melt viscosity at 200° C. is measured in a similar manner and the rate of change in melt viscosity is calculated with formula (2).

In the resin [D], heating loss at the molding temperature measured under a temperature rising (in air) condition of 10° C./min is preferably equal to or less than 5% by weight. When the heating loss is equal to or less than 5% by weight, generation of decomposed gas at the time of impregnation can be suppressed, and void generation inside the resin impregnated reinforcing fiber filament [E] can be suppressed. Moreover, volatilization at the time of molding can be suppressed, and defects resulting from a volatile matter inside the molded article can be suppressed. The heating loss is more preferably equal to or less than 3% by weight.

"Heating loss" expresses a weight reduction ratio of the resin [D] after heating under the heating condition with the weight of the resin [D] before heating represented as 100%, and can be determined by formula (3). The weight before and after heating can be determined by measuring the weight at the molding temperature with thermogravimetric analysis (TGA) under a condition of a temperature rising speed of 10° C./min in the air atmosphere, using a platinum sample pan.

(Heating Loss)[% by weight]={(Weight Before Heating–Weight After Heating)/Weight Before Heating}×100    (3).

The resin impregnated reinforcing fiber [E] is obtained by melt-impregnating the reinforcing fiber filaments [B] with the reinforcing fiber modifier [C] and/or the resin [D].

The epoxy resin to be preferably used as the resin [D] is a compound having two or more epoxy groups but does not substantially include a curing agent, and is not cured by so-called three-dimensional crosslinking even when being heated. When the epoxy resin has a glycidyl group, the epoxy resin tends to interact with the reinforcing fibers [B], and the epoxy resin has a higher affinity with the resin impregnated reinforcing fiber filament [E] and the resin impregnated reinforcing fiber filament [E] tends to be impregnated with the epoxy resin, and therefore it is preferable. Moreover, the dispersibility of the reinforcing fibers [B] at the time of molding process can be further improved.

Examples of a compound having a glycidyl group include glycidyl ether-type epoxy resin, glycidyl ester-type epoxy resin, glycidyl amine-type epoxy resin, and alicyclic epoxy resin. Two or more types thereof may be used.

Examples of the glycidyl ether-type epoxy resin include bisphenol A epoxy resin, bisphenol F epoxy resin, bisphenol AD epoxy resin, halogenated bisphenol A epoxy resin, bisphenol S epoxy resin, resorcinol-type epoxy resin, hydrogenated bisphenol A epoxy resin, phenol novolak-type epoxy resin, cresol novolak-type epoxy resin, aliphatic epoxy resin having an ether linkage, naphthalene-type epoxy resin, biphenyl-type epoxy resin, biphenyl aralkyl-type epoxy resin, and dicyclopentadiene-type epoxy resin.

Examples of the glycidyl ester-type epoxy resin include hexahydro phthalic acid glycidyl ester and dimer acid diglycidyl ester.

Examples of the glycidyl amine-type epoxy resin include triglycidyl isocyanurate, tetraglycidyl diaminodiphenylmethane, tetraglycidyl metaxylene diamine, and aminophenol-type epoxy resin.

Examples of the alicyclic epoxy resin include 3,4-epoxy-6-methylcyclohexyl methyl carboxylate and 3,4-epoxycyclohexyl methyl carboxylate.

Among them, a glycidyl ether-type epoxy resin is preferable because of excellent balance between viscosity and heat resistance, and a bisphenol A epoxy resin and a bisphenol F epoxy resin are more preferable.

Moreover, the number-average molecular weight of the epoxy resin to be used as the resin [D] is preferably 200 to 5,000. When the number-average molecular weight of the epoxy resin is equal to or larger than 200, the dynamic characteristics of the molded article can be further improved. The number-average molecular weight is more preferably equal to or larger than 800, and is further preferably equal to or larger than 1,000. On the other hand, when the number-average molecular weight of the epoxy resin is equal to or smaller than 5,000, the impregnability to the reinforcing fibers [B] is excellent, and the dispersibility of the reinforcing fibers [B] can be further improved. The number-average molecular weight is more preferably equal to or smaller than 4,000, and is further preferably equal to or smaller than 3,000. The the number-average molecular weight of the epoxy resin can be measured using gel permeation chromatography (GPC).

Moreover, examples of the terpene resin include homopolymers and copolymers obtained by polymerizing a terpene monomer with an aromatic monomer or the like, if necessary, in the presence of Friedel-Crafts type catalyst in an organic solvent.

Examples of the terpene monomer include α-pinene, β-pinene, dipentene, d-limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, paramenthadienes, and monocyclic monoterpene such as carene. Moreover, examples of the aromatic monomer include styrene and α-methyl styrene.

Among them, a terpene monomer selected from α-pinene, β-pinene, dipentene, and d-limonene is preferable because of excellent compatibility with the thermoplastic resin [A]. Furthermore, a homopolymer of these terpene monomers is more preferable. Moreover, a hydrogenated terpene resin obtained by hydrogenating these terpene resins is preferable because of further excellent compatibility with the thermoplastic resin [A], particularly with a polypropylene.

Although the glass transition temperature of the terpene resin is not especially limited, the glass transition temperature is preferably 30 to 100° C. When the glass transition temperature is equal to or higher than 30° C., the handleability of the resin [D] at the time of molding process is excellent. When the glass transition temperature is equal to or lower than 100° C., the fluidity of the resin [D] at the time of molding process can be suppressed moderately, and the moldability can be improved.

Moreover, the number-average molecular weight of the terpene resin is preferably 200 to 5,000. When the number-average molecular weight is equal to or larger than 200, the bending strength and tensile strength of the molded article can be further improved. When the number-average molecular weight is equal to or smaller than 5,000, moderately low viscosity of the terpene resin leads to excellent impregnability, and the dispersibility of the reinforcing fibers [B] in the molded article can be further improved. The number-average molecular weight of the terpene resin can be measured using gel permeation chromatography (GPC).

The terpenephenol resin is obtained by reacting a terpene monomer with phenols with the use of a catalyst. A compound having one to three alkyl groups, halogen atoms and/or hydroxyl groups on a benzene ring of phenol is preferably used as the phenols. Specific examples thereof may include cresol, xylenol, ethylphenol, butylphenol, t-butylphenol, nonylphenol, 3,4,5-trimethylphenol, chlorophenol, bromophenol, chlorocresol, hydroquinone, resorcinol, and orcinol. Two or more types thereof may be used. Among them, a phenol and a cresol are preferable.

Moreover, the number-average molecular weight of the terpenephenol resin is preferably 200 to 5,000. When the number-average molecular weight is equal to or larger than 200, the bending strength and tensile strength of the molded article can be further improved. When the number-average molecular weight is equal to or smaller than 5,000, moderately low viscosity of the terpenephenol resin leads to excellent impregnability, and dispersibility of the reinforcing fibers [B] in the molded article can be further improved. The number-average molecular weight of the terpenephenol resin can be measured using gel permeation chromatography (GPC).

Although a method of impregnating the reinforcing fibers [B] with the reinforcing fiber modifier [C] and/or the resin [D] to obtain the resin impregnated reinforcing fiber [E] is not especially limited, examples thereof include a method including a step (Step (I)) of supplying the reinforcing fibers [B] with the resin [D] and bringing the resin [D] into contact with the reinforcing fibers [B] and a step (Step (II)) of heating the reinforcing fibers [B] which have been in contact with the resin [D], obtained in Step (I), to impregnate the reinforcing fibers [B] with the resin [D], when the resin [D] is used for impregnation. Although an example of when the resin [D] is used for impregnation will be hereinafter described, the same is applied to when the reinforcing fiber modifier [C] is used for impregnation.

Although the method of supplying the resin [D] to bring the resin [D] into contact with the reinforcing fibers [B] in Step (I) above is not especially limited, any method to be used to provide reinforcing fibers with an oil solution, a sizing agent, a matrix resin or the like can be used, for example. Among them, dipping or coating is preferably used.

Dipping means a method of supplying the resin [D] into a melting bath using a pump and passing the reinforcing fibers [B] through the melting bath. By dipping the reinforcing fibers [B] in the melting bath of the resin [D], the reinforcing fibers [B] can be surely impregnated with the resin [D]. Moreover, coating means a method of applying the resin [D] onto the reinforcing fibers [B] by using a coating means such as a reverse roll method, a normal rotating roll method, a kiss roll method, a spray method, or a curtain method. A reverse roll method, a normal rotating roll method, and a kiss roll method indicate a method of supplying a roll with the resin [D] molten using a pump and bringing the roll into contact with the reinforcing fibers [B] to apply the molten material of the resin [D] onto the reinforcing fibers [B]. Furthermore, a reverse roll method is a method in which two rolls rotate in directions opposite to each other to apply the resin [D], and a normal rotating roll method is a method in which two rolls rotate in the same direction to apply the resin [D]. In the reverse roll method and the normal rotation roll method, a method of placing an additional roller to sandwich the reinforcing fibers [B] with rollers to surely impregnate the reinforcing fibers [B] with the resin [D] is normally used. On the other hand, the kiss roll method is a method in which a roller is only brought into contact with the reinforcing fibers [B] to impregnate the reinforcing fibers [B] with the resin [D]. The kiss roll method is therefore preferable for use when the viscosity is relatively low. In any of the roll methods, the reinforcing fibers [B] can be impregnated with a predetermined amount of the resin [D] per unit length of the reinforcing fiber, by running a roller in a state where the roller is brought into contact with the reinforcing fibers [B]. A spray method is a method in which the principle of spraying is utilized and the resin [D] molten is atomized and sprayed onto the reinforcing fibers [B]. A curtain method is a method in which the resin [D] molten is naturally dropped through pores or overflowed from a melting tank to apply the resin [D] on the reinforcing fibers [B]. The curtain method can easily adjust the amount required for application, and therefore the method can decrease loss of the resin [D].

In the above steps, the melting temperature at the time of supplying the resin [D] (temperature in the melting bath) is preferably 100 to 300° C. When the melting temperature is equal to or higher than 100° C., the viscosity of the resin [D] can be suppressed moderately, and uneven impregnation can be suppressed. The melting temperature is more preferably equal to or higher than 150° C. On the other hand, when the melting temperature is equal to or lower than 300° C., thermal decomposition of the resin [D] can be suppressed even when manufacturing is performed for a long time. The melting temperature is more preferably equal to or lower than 250° C. The resin [D] can be stably supplied by bringing the resin [D] into contact with the reinforcing fibers [B] in a molten state at 100 to 300° C.

Next, the step (Step (II)) of heating the reinforcing fibers [B], obtained in Process (I), in contact with the resin [D] to impregnate the reinforcing fibers [B] with the resin [D] will be described. Specifically, this is the step of impregnating the inside of the reinforcing fibers [B] with the resin [D] by operations such as applying tensile force with a roller or a bar, repeating widening and bundling, or applying pressure or vibration, to the reinforcing fibers [B] in contact with the resin [D] at a temperature at which the resin [D] melts. More specific examples of the step may include a method of passing the reinforcing fibers [B] to be brought into contact with surfaces of a plurality of heated rollers or bars to perform widening. Especially, a method of using a drawing spinneret, a drawing roller, a roll press, or a double belt press for impregnation is suitably used. The drawing spinneret is a spinneret with a spinneret diameter narrowing toward the running direction that bundles the reinforcing fibers [B] while scraping extra adhering resin [D] off and promotes impregnation at the same time. Moreover, the drawing roller is a roller which applies tensile force to the reinforcing fibers [B] to scrape extra adhering resin [D] off and promotes impregnation at the same time. Moreover, the roll press is a device which continuously removes air from the inside of the reinforcing fibers [B] with pressure between two rollers and promotes impregnation at the same time. The double belt press is a device that presses the reinforcing fibers [B] from an upper side and a lower side via a belt to promote impregnation.

In Step (II), the reinforcing fibers [B] are preferably impregnated with 80 to 100% by weight of the supply amount of the resin [D]. When the impregnation amount is equal to or larger than 80% by weight, generation of a volatile ingredient due to the resin [D] in Step (II) can be suppressed, and void generation inside the resin impregnated reinforcing fiber [E] can be suppressed. From the viewpoint of economic efficiency and productivity, it is preferable as the impregnation amount to the supply amount increases. The impregnation amount is more preferably 85 to 100% by weight, and is further preferably 90 to 100% by weight.

In Step (II), the maximum temperature of the resin [D] is preferably 150 to 400° C. When the maximum temperature is equal to or higher than 150° C., the resin [D] is sufficiently melted and more effective impregnation can be achieved. The maximum temperature is more preferably equal to or higher than 180° C., and is further preferably equal to or higher than 200° C. On the other hand, when the maximum temperature is equal to or lower than 400° C., an unfavorable side reaction such as a decomposition reaction of the resin [D] can be suppressed. The maximum temperature is more preferably equal to or lower than 380° C., and is further preferably equal to or lower than 350° C.

Although the heating method in Step (II) is not especially limited, specific illustrations thereof include a method of using a heated chamber, and a method of applying heat and pressure simultaneously using a hot roller.

From the viewpoint of suppressing occurrence of an unfavorable side reaction such as a crosslinking reaction or decomposition reaction of the resin [D], it is preferable to apply heat under a non-oxidation atmosphere. The non-oxidation atmosphere indicates an atmosphere, which has an oxygen concentration equal to or lower than 5% by volume, preferably has an oxygen concentration equal to or lower than 2% by volume, or further preferably does not contain oxygen, that is, an inert gas atmosphere such as nitrogen, helium, or argon. Especially, a nitrogen atmosphere is preferable in terms of the economic efficiency and the easiness of handling.

As a previous step of Steps (I) and (II) above, the reinforcing fiber [B] filament may be previously subjected to opening. The opening is an operation of separating a bundled reinforcing fiber filament, and is expected to provide an effect of further enhancing the impregnability of the resin [D]. The opening decreases the thickness of the reinforcing fiber filament. When the width and thickness of the reinforcing fiber filament before opening are respectively expressed as $b_1$ (mm) and $a_1$ (μm) and the width and thickness of the reinforcing fiber filament after opening are respectively expressed as $b_2$ (mm) and $a_2$ (μm), Opening Ratio=$(b_2/a_2)/(b_1/a_1)$ is preferably equal to or larger than 2.0, and is further preferably equal to or larger than 2.5.

The opening method of the reinforcing fiber filament is not especially limited and, for example, a method of passing the reinforcing fiber filament alternately through a recess roller and a projection roller, a method of using a drum-shaped roller, a method of applying tension fluctuation to vibration in the axial direction, a method of fluctuating tensile force of the reinforcing fiber filament with two friction bodies which vertically reciprocate, a method of spraying air onto the reinforcing fiber filament or the like may be utilized.

Figure 6:
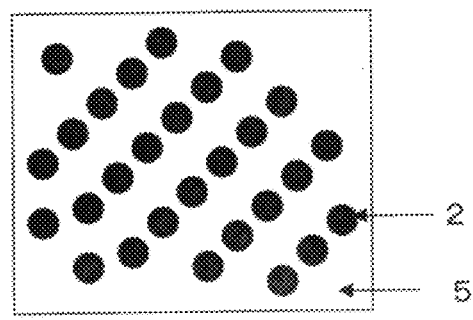
FIG. 6 is a schematic drawing illustrating an example of a transverse cross-sectional form of a resin impregnated reinforcing fiber filament [E].

FIG. 6 is a schematic drawing illustrating an example of a transverse cross-sectional form of the resin impregnated reinforcing fiber filament [E]. A transverse cross-section means a cross-section on a plane perpendicular to the axial direction of the resin impregnated reinforcing fiber filament [E]. The reinforcing fiber modifier [C] and/or the resin [D] 5 is filled between fibers 1 of the reinforcing fibers [B] 2. That is, it is a state where fibers of the reinforcing fibers [B] are dispersed like islands in sea of the reinforcing fiber modifier [C] and/or the resin [D].

The molding material can be obtained by coating the resin impregnated reinforcing fiber filament [E] with the thermoplastic resin [A] or a resin composition including the thermoplastic resin [A]. A preferable method of obtaining the structure includes arranging the molten resin composition including the thermoplastic resin [A] to be in contact with the resin impregnated reinforcing fiber filament [E], followed by cooling and solidification. Although the technique thereof is not especially limited, specific examples thereof may include a method of using an extruder and a coating die for wire coating to continuously arrange the resin composition including the thermoplastic resin [A] around the resin impregnated reinforcing fiber filament [E] to coat the resin impregnated reinforcing fiber filament [E], and a method of arranging the molten resin composition including the thermoplastic resin [A] in a film shape by using an extruder and a T die from one face or both faces of the resin impregnated reinforcing fiber filament [E] flattened by a roller or the like and allowing to be integrated by using a roller or the like.

The molding material is not necessarily constituted of a single molding material, and may be a combination of two or more types of molding materials. When two or more types of molding materials are combined, examples of a manufacturing method thereof include a method of dry-blending (i) a molding material (Blend Ingredient 1) including the thermoplastic resin [A], and the resin impregnated reinforcing fiber filament [E] obtained by impregnating the reinforcing fibers [B] with the reinforcing fiber modifier [C], and (ii) a molding material (Blend Ingredient 2) constituted of a resin composition obtained by melt-kneading the thermoplastic resin [A] and the reinforcing fiber modifier [C] such that the content of each ingredient falls within the above range. The mixing ratio of Blend Ingredient 1 and Blend Ingredient 2 (Blend Ingredient 1/Blend Ingredient 2) is preferably from 75/25 to 25/75, is more preferably from 70/30 to 30/70, and is further preferably from 67/33 to 33/67. It is preferable to adjust the compositions of Blend Ingredient 1 and Blend Ingredient 2 such that the content of each ingredient falls within the preferable range in the mixing ratio.

The molding material may contain other ingredients in addition to the ingredients [A] to [C], and the resin [D] if necessary, without impairing the desired effect. Examples of the other ingredients include the thermoplastic resin [F] and the thermally conductive filler [G]. When the molding material contains the thermoplastic resin [F], the dynamic characteristics such as the bending strength and impact strength of the molded article can be further improved. When the molding material contains the thermally conductive filler [G], the thermal conductivity of the molded article can be improved.

The compounds illustrated above can be used as the thermoplastic resin [F]. Among them, an MBS resin, an SBS resin or an SEBS resin, which is a rubber-modified styrene-based resin, is preferable from the viewpoint of further improving the impact strength of the molded article.

The content of the thermoplastic resin [F] in the molding material is preferably 0.5 to 10 parts by weight relative to total 100 parts by weight of the ingredients [A] to [C]. When the content of the thermoplastic resin [F] is equal to or larger than 0.5 parts by weight, the impact strength of the molded article can be further improved. The content is preferably equal to or larger than 1 part by weight, and is further preferably equal to or larger than 2 parts by weight. On the other hand, when the content of the thermoplastic resin [F] is equal to or smaller than 10 parts by weight, the rigidity of the molded article can be improved, and the bending strength and bending modulus can be further improved. The content is more preferably equal to or smaller than 7 parts by weight, and is further preferably equal to or smaller than 5 parts by weight.

The compounds illustrated above can be used as the thermally conductive filler [G]. Among them, graphite is preferable. When the thermally conductive filler [G] contains graphite, the exposed fiber length ($L_B$) and weight-average fiber length ($L_W$) of the reinforcing fibers [B] in the molded article can be further increased, and the mechanical characteristics such as the bending strength and bending modulus of the molded article can be further improved. Furthermore, the thermal conductivity of the molded article in the thickness direction can be increased.

The particle diameter of graphite in the molding material is preferably 50 to 500 μm. When the particle diameter of graphite in the molding material is equal to or larger than 50 μm, break of the reinforcing fibers [B] can be further suppressed. The particle diameter of graphite is more preferably equal to or larger than 60 μm, and is further preferably equal to or larger than 70 μm. On the other hand, when the particle diameter of graphite in the molding material is equal to or smaller than 500 μm, the dispersibility in the molded article can be improved, and the external appearance can be improved. The particle diameter of graphite is more preferably equal to or smaller than 400 μm, and is further preferably equal to or smaller than 300 μm. Moreover, when the particle diameter of graphite in the molding material is within the above preferable range, the particle diameter of graphite in the molded article can be easily adjusted to fall within the above preferable range.

The content of the thermally conductive filler [G] in the molding material is preferably 1 to 40 parts by weight relative to total 100 parts by weight of the thermoplastic resin [A], the reinforcing fibers [B], and the reinforcing fiber modifier [C]. When the content of the thermally conductive filler [G] is equal to or larger than 1 part by weight, the thermal conductivity, bending strength, and bending modulus of the molded article can be further improved. The content is preferably equal to or larger than 3 parts by weight, and more preferably equal to or larger than 5 parts by weight. On the other hand, when the content of the thermally conductive filler [G] is equal to or smaller than 40 parts by weight, the rigidity of the molded article can be moderately suppressed, and the bending strength can be further improved. The content is more preferably equal to or smaller than 35 parts by weight, and further preferably equal to or smaller than 30 parts by weight.

The molding material is molded to be a molded article by a technique such as injection molding or press molding. In terms of handleability of the molding material, the resin impregnated reinforcing fiber filament [E] and the thermoplastic resin [A] are preferably kept to be bonded to each other and not to be separated, and keep the aforementioned shapes until molding is performed. The resin impregnated reinforcing fiber filament [E] and the thermoplastic resin [A] have completely different shapes (sizes or aspect ratios), specific gravities, and masses, and therefore when the resin impregnated reinforcing fiber filament [E] and the thermoplastic resin [A] are separated from each other, they are classified during material transport or handling before molding, material transfer in the molding process, and the like, and this may cause unevenness in the dynamic characteristics of the molded article, lowering of the fluidity leading to mold clogging, or blocking in the molding process. When the molding material has a core-in-sheath structure illustrated in FIG. 4, it is preferable since the thermoplastic resin [A] constrains the resin impregnated reinforcing fiber filament [E] and firmer conjugation is obtained.

The molding material may have a continuous form or may be cut into a certain length. The length of the molding material is preferably 1 to 50 mm, and it is possible with such a length to sufficiently enhance the fluidity and the handleability at the time of molding. A long-fiber pellet for injection molding can be illustrated as an especially preferable mode of the molding material cut into a proper length.

The molding material can also be used even in a continuous and long form according to a molding method. For example, the molding material can be wound around a mandrel while being subjected to heating as a thermoplastic yarn prepreg to obtain a rolled molded article. Examples of the molded article include a liquefied natural gas tank. Moreover, it is also possible to prepare a unidirectional thermoplastic prepreg by arranging a plurality of the molding materials having continuous and long forms in one direction, followed by heating and melting. Such a prepreg can be applied to a field where lightness, high strength, modulus and impact resistance are required, e.g., to an automobile member.

The molded article can be obtained by molding the molding material. Although a molding method is not especially limited, examples of a highly productive molding method may include injection molding, autoclave molding, press molding, filament winding molding, and stamping molding. These can also be used in combination. Moreover, these can be applied to integration molding such as insert molding or outsert molding. Furthermore, a highly productive adhesion method such as heat welding, vibration welding, or ultrasonic welding, or orthodontic treatment by heating can be utilized after the molding. Among them, a molding method using a mold is preferable. Especially, a stable molded article can be obtained continuously by a molding method using an injection molding machine. Although the conditions of the injection molding are not particularly regulated, preferable examples thereof include conditions of injection time: 0.5 seconds to 10 seconds, or more preferably 2 seconds to 10 seconds, backpressure: 0.1 MPa to 15 MPa, more preferably 2 MPa to 10 MPa, or further preferably 2 MPa to 8 MPa, holding pressure: 1 MPa to 50 MPa, or more preferably 1 MPa to 30 MPa, pressure holding time: 1 second to 20 seconds, or more preferably 5 seconds to 20 seconds, cylinder temperature: 200° C. to 320° C., and mold temperature: 20° C. to 100° C. The cylinder temperature indicates a temperature of a part of the injection molding machine where the molding material is heat-melted, and the mold temperature indicates a temperature of a mold to which a resin to form a predetermined shape is injected. By appropriately selecting these conditions, particularly the injection time, the backpressure, and the mold temperature, the exposed fiber length ($L_B$) and weight-average fiber length ($L_W$) of the reinforcing fibers [B] in the molded article can be adjusted to fall within the above preferable range.

Examples of uses of the molded article include various modules such as an instrument panel, a door beam, an undercover, a lamp housing, a pedal housing, a radiator support, a spare tire cover, and a frontend; automobile components, members, and outside plates such as a cylinder head cover, a bearing retainer, an intake manifold, and a pedal; aircraft-related components, members, and outside plates such as a landing gear pod, a winglet, a spoiler, an edge, a ladder, a fairing, and a rib: tools such as a monkey and a wrench; home and office electric appliance components such as a telephone, a facsimile, VTR, a copier, a television, a microwave oven, acoustic equipment, toiletry goods, LaserDisc (registered trademark), a refrigerator, and an air conditioner; and electrical and electric equipment such as housings for a personal computer, a digital camera, and a portable telephone, and a keyboard support which is a member to support a keyboard inside a personal computer. When carbon fibers having conductivity are used as the reinforcing fibers [B], an electromagnetic wave shielding property is provided, and therefore the molded article can be more preferably used for electrical and electric equipment members.

EXAMPLES

Hereinafter, our materials and articles will be described in detail by way of examples, but the following examples should not limit this disclosure. First, evaluation methods of various characteristics will be described.
(1) Melt Viscosity The melt viscosities at 200° C. of a thermoplastic resin [A], a reinforcing fiber modifier [C], and a resin [D], which were used for each of Examples and Comparative Examples, were measured with a viscoelasticity measuring instrument at 0.5 Hz by using a parallel plate of 40 mm. Further, the resin [D] was placed still for two hours in a hot air drier at 200° C., and then the melt viscosity at 200° C. was measured in a similar manner.
(2) Exposed Fiber Length of Reinforcing Fibers [B] in Fracture Surface of Molded Article Test pieces each having a size of 80 mm×10 mm×4 mm in thickness obtained from Examples and Comparative Examples were subjected to notching with a notch angle of 45° and a depth of 2 mm in conformity to ISO 2818:1994. The test pieces subjected to notching were then destroyed by applying impact of a destruction speed of 2.9 m/sec using a hammer of 1.0 J in conformity to ISO 179-1:2010. The fracture surface of the destroyed test piece was observed with an optical microscope (50 to 1,000 times). The lengths of 1,000 reinforcing fibers [B] randomly selected from reinforcing fibers [B] exposed from the fracture surface of each molded article were measured, and the number-average values thereof was obtained as an exposed fiber length ($L_B$). When the fracture surface of the molded article is not flat, a fracture surface was specified for each selected reinforcing fiber [B] and the exposed fiber length ($L_B$) was calculated.
(3) Weight-Average Fiber Length of Reinforcing Fibers [B] in Molded Article Test pieces each having a size of 80 mm×10 mm×4 mm in thickness obtained from Examples and Comparative Examples were subjected to notching with a notch angle of 45° and a depth of 2 mm in conformity to ISO 2818:1994. The test pieces subjected to notching were then destroyed by applying impact using a hammer of 1.0 J in conformity to ISO 179-1:2010. The destroyed test piece was sandwiched between glass plates, and was placed and heated on a hot stage at 200 to 300° C. in the sandwiched state to obtain a film in which the reinforcing fibers [B] were homogeneously dispersed. The film in which the reinforcing fibers [B] were homogeneously dispersed was observed with an optical microscope (50 to 200 times). The fiber lengths of 1,000 reinforcing fibers [B] selected randomly were measured. The weight-average fiber length ($L_W$) was calculated from the following formula since common reinforcing fibers were used for all examples and the density and diameter of the reinforcing fiber were the same:

$$\text{Weight-Average Fiber Length} = \Sigma(Mi^2 \times Ni)/\Sigma(Mi \times Ni)$$

Mi: Fiber Length (mm)
Ni: The Number of Fibers having Fiber Length Mi.
(4) Adhesion Ratio of Reinforcing Fiber Modifier [C] to Fiber Surface in Molded Article Test pieces each having a size of 80 mm×10 mm×4 mm in thickness obtained from Examples and Comparative Examples were subjected to notching with a notch angle of 45° and a depth of 2 mm in conformity to ISO 2818:1994. Regarding the test piece subjected to notching, a vertical cross-section to the longitudinal direction of the reinforcing fiber [B] was cut out from the test piece destroyed using a hammer of 1.0 J in conformity to ISO 179-1:2010, and the vertical cross-section was observed with a TEM at a magnification of 40,000 times. Five reinforcing fibers [B] were randomly selected from the TEM observation image, and the diameter of each of the reinforcing fibers [B] and the end part distance ($L_{cl}$) of the reinforcing fiber modifier [C] existing on the circumferential surface of the reinforcing fiber [B] were measured. The end part distance ($L_{cl}$) indicates the length of the reinforcing fiber modifier [C] in a direction parallel to the circumferential surface of the reinforcing fiber [B] as illustrated in FIG. 1. The end part distance of the reinforcing fiber modifier [C] existing on the circumferential surface of the reinforcing fiber [B] was measured, and the adhesion ratio [%] was calculated from the following formula (1). At this time, the adhesion ratio was represented as 100% when the reinforcing fiber modifier [C] covers the entire surface of the reinforcing fiber [B] without a break. The adhesion ratio was measured for five reinforcing fibers [B] selected randomly, and the number-average value thereof was calculated.

Reinforcing Fiber Modifier Adhesion Ratio
[%]={Sum Total of Respective End Part Distance($L_{cI}$) of Reinforcing Fiber Modifier [C] Detected from TEM Cross-Section Observation/ [Diameter ($D$) of Reinforcing Fiber [B] at Vertical Cross-Section in Longitudinal Direction of Fiber×Circular Constant ($TE$)]}×100     (1).

(5) Film Thickness of Reinforcing Fiber Modifier [C] Adhering to Fiber Surface in Molded Article Test pieces each having a size of 80 mm×10 mm×4 mm in thickness obtained from Examples and Comparative Examples were subjected to notching with a notch angle of 45° and a depth of 2 mm in conformity to ISO 2818:1994. Regarding the test piece subjected to notching, a vertical cross-section to the longitudinal direction of the reinforcing fiber [B] was cut out from the test piece destroyed using a hammer of 1.0 J in conformity to ISO 179-1:2010, and the vertical cross-section was observed with a TEM at a magnification of 40,000 times. Five reinforcing fibers [B] were randomly selected from the TEM observation image, and the maximum film thickness ($L_{cII}$) of the reinforcing fiber modifier [C] existing on the circumferential surface of the reinforcing fiber [B] as illustrated in FIG. 2 was measured. The maximum film thickness ($L_{cII}$) was measured for five reinforcing fibers [B] selected randomly, and the number-average value thereof was calculated.

(6) Fiber Dispersibility of Molded Article

The number of undispersed reinforcing fiber filaments existing on the right face and reverse face of a test piece having a size of 80 mm×80 mm×3 mm in thickness obtained from each of Examples and Comparative Examples was counted visually. The total number of undispersed reinforcing fiber filaments was determined for fifty test pieces, and the fiber dispersibility was judged based on the following criteria. A and B were judged as acceptable.

A: The number of undispersed reinforcing fiber filaments was smaller than 1.

B: The number of undispersed reinforcing fiber filaments was equal to or larger than 1 and smaller than 10.

C: The number of undispersed reinforcing fiber filaments was equal to or larger than 10.

(7) Bending Strength and Bending Modulus of Molded Article

Regarding ISO dumbbell test pieces obtained from Examples and Comparative Examples, the fulcrum distance was set at 64 mm using a 3-point bending test jig (indenter diameter of 5 mm) in conformity to ISO 178, and the bending strength and the bending modulus were measured under a text condition of a test speed of 2 mm/min. Used as a testing machine was "Instron (registered trademark)" universal testing machine 5566 (manufactured by INSTRON).

(8) Impact Strength of Molded Article

Test pieces each having a size of 80 mm×10 mm×4 mm in thickness obtained from Examples and Comparative Examples were subjected to notching with a notch angle of 45° and a depth of 2 mm in conformity to ISO 2818:1994. Regarding the test piece subjected to notching, the notched Charpy impact strength was measured using a hammer of 1.0 J in conformity to ISO 179-1:2010.

(9) Thermal Conductivity Measurement of Molded Article

Test pieces each having a size of 20 mm×20 mm×4 mm in thickness were each cut out from ISO dumbbell test pieces obtained from Examples and Comparative Examples, and the thermal conductivity of the test piece at 80° C. in the thickness direction was measured using GH-1S manufactured by ULVAC-RIKO. Moreover, five test pieces each having a size of 20 mm×4 mm×4 mm in thickness were cut out from the ISO dumbbell test piece, laterally arranged perpendicularly to a resin flow direction at the time of molding, and the thermal conductivity in a flow direction at 80° C. was measured using GH-1S manufactured by ULVAC-RIKO.

Reference Example 1: Preparation of Carbon Fibers

A copolymer containing polyacrylonitrile as a principal ingredient was used as a raw material to obtain homogeneous carbon fibers [B-1] having a total single yarn number of 24,000, a single fiber diameter of 7 μm, a mass per unit length of 1.6 g/m, a specific gravity of 1.8 g/cm$^3$, and a surface oxygen concentration ratio [O/C] of 0.12 through processes of spinning, baking and surface oxidation. The strand tensile strength of the carbon fibers was 4,880 MPa, and the strand tensile modulus was 225 GPa.

The surface oxygen concentration ratio was determined according to the following procedures by X-ray photoelectron spectroscopy, with use of carbon fibers subjected to surface oxidation. First, a carbon fiber filament was cut into a length of 20 mm and expanded and arranged on a sample support made of copper to obtain a measurement sample. The measurement sample was set on a sample chamber of an X-ray photoelectron spectroscopic device, and then the inside of the sample chamber was kept at 1×10$^{-8}$ Torr and measurement was made using AlKα1,2 as an X-ray source. The kinetic energy value (K.E.) of a main peak of $C_{1s}$ was adjusted to 1,202 eV as a peak correction value associated with electrification at the time of measurement. The $C_{1s}$ peak area was determined by drawing a straight base line within a range of 1,191 to 1,205 eV as K.E. The $O_{1s}$ peak area was determined by drawing a straight base line within a range of 947 to 959 eV as K.E. The surface oxygen concentration [O/C] was calculated as an atomic ratio from the $C_{1s}$ peak area and the $O_{1s}$ peak area by using a sensitivity correction value unique to the device. Model ES-200 manufactured by Kokusai Electric was used as the X-ray photoelectron spectroscopic device, and a sensitivity correction value of 1.74 was used.

Next, a sizing treatment liquid was prepared as a sizing agent by dissolving polyglycerol polyglycidyl ether (epoxy equivalent: 140 g/eq) in water to have a concentration of 2% by weight. To have an adhesion amount of 1.0% by weight, the sizing agent was provided to the carbon fibers by an immersion method, the resultant was dried at 230° C., and a filament of the carbon fibers [B-1] obtained. The sizing agent adhesion amount of the carbon fibers thus obtained was 1.0% by weight. The solubility parameter value of the sizing agent was calculated, and the result was 10.

Reference Example 2: Preparation of Resin Impregnated Reinforcing Fiber Filament [E]

A film of a liquid obtained by heat-melting an epoxy resin [D-1] illustrated in each of Examples and Comparative Examples was formed on a roller heated at a coating temperature of 150° C. A reverse roller was used to form a film having a constant thickness on a roller. The continuous carbon fiber [B-1] filament obtained in Reference Example 1 was passed on the roller while being brought into contact with the roller to allow the epoxy resin [D-1] to adhere. Next, the carbon fiber filament to which epoxy resin adhered was passed between five pairs of roll presses each having a diameter of 50 mm in a chamber heated to a temperature of 250° C. under a nitrogen atmosphere. With such operation, the inside of the carbon fiber filament was impregnated with the epoxy resin [D-1], and the resin impregnated reinforcing fiber filament [E-1] was obtained.

Reference Example 3: Preparation of Thermoplastic Resin Composition

A blend obtained by dry-blending the thermoplastic resin [A], the reinforcing fiber modifier [C], the thermoplastic resin [F], and the thermally conductive filler [G] illustrated in each of Examples and Comparative Examples to have composition ratios illustrated in Examples and Comparative Examples was supplied from a main hopper by using TEX-30α type twin-screw extruder (screw diameter of 30 mm, die diameter of 5 mm, barrel temperature of 290° C., and screw speed of 150 rpm) manufactured by JSW, and the mixture was melt-kneaded while performing deaeration through a downstream gas vent. A molten resin composition was discharged from a dye port, and the obtained strand was cooled and then cut by a cutter to obtain pellets of a thermoplastic resin composition.

The raw materials used in each of Examples and Comparative Examples will be illustrated below.

Thermoplastic Resin [A-1]

A polycarbonate resin ("Panlite" (registered trademark) L-1225L manufactured by Teijin Chemicals Ltd.) was used. The melt viscosity at 200° C. was measured by the method described in (1), and the result was 14,000 Pa·s.

Thermoplastic Resin [A-2]

A polyamide 6 resin ("Amilan" (registered trademark) CM1001 manufactured by TORAY INDUSTRIES, INC.) was used. The melt viscosity at 200° C. was measured by the method described in (1), and the result was 1,000 Pa·s.

Thermoplastic Resin [A-3]

A pellet blend of a polypropylene resin ("Prime Polypro" (registered trademark) J137G manufactured by Prime Polymer Co., Ltd.) and a maleic acid-modified polypropylene resin ("ADMER" (registered trademark) QE840 manufactured by Mitsui Chemicals, Inc.) (PP) in a weight ratio of 85/15 was used. The viscosity at 200° C. was measured by the method described in (1), and the result was 50 Pa·s.

Reinforcing Fiber Modifier [C-1]

An olefinic wax ("DIACARNA" (registered trademark) 30 manufactured by Mitsubishi Chemical Corporation) having carboxyl groups was used. The wax was charged into a tank in an impregnation assistant application apparatus, the temperature in the tank was set at 200° C., and the wax heated for one hour to be put into a molten state. The melt viscosity at 200° C. at this time was measured by the method described in (1), and the result was 0.03 Pa·s. The weight-average molecular weight measured by GPC was 9,000. A measurement method of GPC was carried out as follows:
Used Model: "150C" manufactured by Waters
Measurement Temperature: 140° C.
Solvent: o-dichlorobenzene (ODCB)
Column: "AD806M/S" (three)
Flow Velocity: 1.0 mL/min
Molecular Weight Standard Substance: standard polystyrene.

Reinforcing Fiber Modifier [C-2]

An olefin compound ("Umex" (registered trademark) 1010 manufactured by Sanyo Chemical Industries, Ltd.) modified by functional groups was used. The compound was charged into a tank in an impregnation assistant application apparatus, the temperature in the tank was set at 200° C., and the compound heated for one hour to be put into a molten state. The melt viscosity at 200° C. at this time was measured by the method described in (1), and the result was 20 Pa·s. The weight-average molecular weight measured by GPC under the same measurement conditions as in (C-1) was 30,000.

Reinforcing Fiber Modifier [C-3]

Water-soluble nylon ("AQ-NYLON" (registered trademark) P70 manufactured by TORAY INDUSTRIES, INC.) was used. The nylon was charged into a tank in an impregnation assistant application apparatus, the temperature in the tank was set at 200° C., and the nylon was heated for one hour to be put into a molten state. The melt viscosity at 200° C. at this time was measured by the method described in (1), and the result was 20 Pa·s. The weight-average molecular weight measured by GPC was 1,000. The amount of an ingredient having a weight-average molecular weight equal to or smaller than 1,000 was measured as follows:
Used Model: "HLC-8320GPC" manufactured by Tosoh Corporation
Measurement Temperature: 40° C.
Solvent: hexafluoroisopropanol (HFIP) (sodium trifluoroacetate concentration of 10 mmol/L)
Column: "TSKgel SuperHM-H (two)
Flow Velocity: 0.3 mL/min
Molecular Weight Standard Substance: polymethyl methacrylate (PMMA).

Resin [D-1]

A bisphenol A epoxy resin ("jER" (registered trademark) 1004AF manufactured by Mitsubishi Chemical Corporation, softening point of 97° C.) in a solid state was used. The resin was charged into a tank in an impregnation assist application apparatus, the temperature in the tank was set at 200° C., and the resin was heated for one hour to be put into a molten state. The melt viscosity at 200° C. at this time was measured by the method described in (1), and the result was 1 Pa·s. Moreover, the rate of change in melt viscosity was measured, and the result was 1.1%.

Thermoplastic Resin [F-1]

A hydrogenated styrene-butadiene block copolymer (SEBS resin) "Tuftec" (registered trademark) M1943 manufactured by Asahi Kasei Chemicals Ltd. was used.

Thermally Conductive Filler [G-1]

Scaly graphite CFW-50A manufactured by Chuetsu Graphite Works Co., Ltd. was used.

Example 1

According to Reference Example 2, the resin impregnated reinforcing fiber filament [E-1] obtained by impregnating the carbon fibers [B-1] with the resin [D-1] was passed through a coating die for a wire covering method placed on the tip of TEX-30α type twin-screw extruder (screw diameter of 30 mm, L/D=32) manufactured by The Japan Steel Works, Ltd. On the other hand, the resin composition that was prepared according to Reference Example 3 and included thermoplastic resin [A-1] and the reinforcing fiber modifier [C-1] was supplied from a main hopper of the TEX-30α type twin-screw extruder, melt-kneaded, discharged in a molten state into the die, and continuously arranged to coat the periphery of the resin impregnated reinforcing fiber filament [E-1]. At this time, the discharge amount of the resin composition was adjusted such that the thermoplastic resin [A], the reinforcing fibers [B], the reinforcing fiber modifier [C], and the resin [D] each had the blending amount shown in Table 1 relative to total 100 parts by weight of the thermoplastic resin [A], the reinforcing fibers [B], and the reinforcing fiber modifier [C]. The obtained continuous molding material was cooled, and then cut with a cutter to obtain a long-fiber pellet resin molding material having a length of 7 mm.

The obtained long-fiber pellet molding material was injection-molded under conditions of injection time: 10 seconds, screw speed: 100 rpm, backpressure: 10 MPa, holding time: 10 seconds, cylinder temperature: 300° C., and mold temperature: 100° C. by using SE75DUZ-C250 type injection molding machine manufactured by Sumitomo Heavy Industries, Ltd. to prepare an ISO tensile dumbbell test piece, a test piece having a size of 80 mm×80 mm×3 mm in thickness, and a test piece having a size of 80 mm×10 mm×4 mm in thickness (molded articles). The cylinder temperature indicates a temperature of a part of the injection molding machine where the molding material is heat-melted, and the mold temperature indicates a temperature of a mold to which a resin to form a predetermined shape is injected. Each of the obtained test pieces (molded articles) was placed still for 24 hours in a thermos-hygrostat chamber adjusted to have a temperature of 23° C. and 50% RH, and then evaluated by the above method. The evaluation results are shown in Table 1.

Example 2

A molded article was prepared in the same manner as in Example 1, except that the reinforcing fiber modifier [C-1] was 0.5 parts by weight and the thermoplastic resin [A-1] was 89.5 parts by weight relative to total 100 parts by weight of the ingredients [A] to [C], and evaluation was made. The evaluation results are shown in Table 1.

Example 3

A molded article was prepared in the same manner as in Example 1, except that the reinforcing fiber modifier [C-1] was 5.0 parts by weight and the thermoplastic resin [A-1] was 85.0 parts by weight relative to total 100 parts by weight of the ingredients [A] to [C], and evaluation was made. The evaluation results are shown in Table 1.

Example 4

A molded article was prepared in the same manner as in Example 1, except that the screw speed at the time of molding was changed to 200 rpm, and evaluation was made. The evaluation results are shown in Table 1.

Example 5

A molded article was prepared in the same manner as in Example 1, except that the reinforcing fiber modifier [C-1] was changed to the reinforcing fiber modifier [C-2], and evaluation was made. The evaluation results are shown in Table 1.

Example 6

A molded article was prepared in the same manner as in Example 1, except that the reinforcing fiber modifier [C-1] was 15 parts by weight and the thermoplastic resin [A-1] was 75.0 parts by weight relative to total 100 parts by weight of the ingredients [A] to [C], and the backpressure at the time of molding was 30 MPa, and evaluation was made. The evaluation results are shown in Table 1.

Example 7

A molded article was prepared in the same manner as in Example 1, except that the thermoplastic resin [F-1] was 2.0 parts by weight relative to total 100 parts by weight of the ingredients [A] to [C], and evaluation was made. The evaluation results are shown in Table 1. Moreover, the thermal conductivity was measured and, as a result, we found that the thermal conductivity in the thickness direction was 0.4 W/m·K and the thermal conductivity in the flow direction was 1.0 W/m·K.

Example 8

A molded article was prepared in the same manner as in Example 1, except that the resin [D-1] was 0 parts by weight relative to total 100 parts by weight of the ingredients [A] to [C], and evaluation was made. The evaluation results are shown in Table 1.

Example 9

A molded article was prepared in the same manner as in Example 1, except that the reinforcing fiber modifier [C-1] was 0 parts by weight and the thermoplastic resin [A-1] was 90.0 parts by weight relative to total 100 parts by weight of the ingredients [A] to [C], and the backpressure was set at 1 MPa, and evaluation was made. The evaluation results are shown in Table 1.

Example 10

A molded article was prepared in the same manner as in Example 7, except that the thermally conductive filler [G-1] was 25.0 parts by weight relative to total 100 parts by weight of the ingredients [A] to [C], and evaluation was made. The evaluation results are shown in Table 1. Moreover, the thermal conductivity was measured and, as a result, we found that the thermal conductivity in the thickness direction was 1.1 W/m·K and the thermal conductivity in the flow direction was 3.5 W/m·K.

Example 11

According to Reference Example 2, the resin impregnated reinforcing fiber filament [E-1] obtained by impregnating the carbon fibers [B-1] with the resin [D-1] was passed through a coating die for a wire covering method placed on the tip of TEX-30α type twin-screw extruder (screw diameter of 30 mm, L/D=32) manufactured by The Japan Steel Works, Ltd. On the other hand, the resin composition that was prepared according to Reference Example 3 and included thermoplastic resin [A-1] and the reinforcing fiber modifier [C-1] was supplied from a main hopper of the TEX-30α type twin-screw extruder, melt-kneaded, discharged in a molten state into the die, and continuously arranged to coat the periphery of the resin impregnated reinforcing fiber filament [E-1]. At this time, the discharge amount of the resin composition was adjusted such that the thermoplastic resin [A-1] was 74.0 parts by weight, the reinforcing fibers [B-1] was 20.0 parts by weight, and the reinforcing fiber modifier [C-1] was 3.0 parts by weight relative to total 100 parts by weight of the thermoplastic resin [A], the reinforcing fibers [B], and the reinforcing fiber modifier [C]. The obtained continuous molding material was cooled, and then cut with a cutter to obtain a long-fiber pellet (X-1) having a length of 7 mm.

Next, according to Reference Example 3, a resin molding material (Y-1) composed of 43.0 parts by weight of the thermoplastic resin [A-1], 3.0 parts by weight of the reinforcing fiber modifier [C-1], 4 parts by weight of the thermoplastic resin [F-1], and 50 parts by weight of the thermally conductive filler [G-1] was obtained.

A molding material was prepared by dry-blending the long-fiber pellet (X-1) and the resin molding material (Y-1) obtained as described above such that (X-1) was 50.0 parts by weight and (Y-1) was 50.0 parts by weight relative to total 100 parts by weight of (X-1) and (Y-1). Regarding the obtained molding material, a molded article was prepared in the same manner as in Example 1, and evaluation was made. The evaluation results are shown in Table 1. Moreover, the thermal conductivity was measured and, as a result, we found that the thermal conductivity in the thickness direction was 1.0 W/m·K and the thermal conductivity in the flow direction was 3.2 W/m·K.

Example 12

A molded article was prepared in the same manner as in Example 8, except that the thermoplastic resin [A-1] was changed to the thermoplastic resin [A-2], and evaluation was made. The evaluation results are shown in Table 1.

Example 13

A molded article was prepared in the same manner as in Example 8, except that the thermoplastic resin [A-1] was changed to the thermoplastic resin [A-3] and the reinforcing fiber modifier [C-1] was changed to the reinforcing fiber modifier [C-3], and evaluation was made. The evaluation results are shown in Table 1.

Comparative Example 1

A molded article was prepared in the same manner as in Example 1, except that the reinforcing fiber modifier [C-1] was 0 parts by weight and the thermoplastic resin [A-1] was 90.0 parts by weight relative to total 100 parts by weight of the ingredients [A] to [C], and evaluation was made. The evaluation results are shown in Table 2.

Comparative Example 2

A molded article was prepared in the same manner as in Example 1, except that the reinforcing fiber modifier was changed to the reinforcing fiber modifier [C-3], and evaluation was made. The evaluation results are shown in Table 2.

Comparative Example 3

A molded article was prepared in the same manner as in Example 1, except that the reinforcing fiber [B-1] was 0.5 parts by weight and the thermoplastic resin [A-1] was 96.5 parts by weight relative to total 100 parts by weight of the ingredients [A] to [C], and the backpressure was changed to 50 MPa, and evaluation was made. The evaluation results are shown in Table 2.

Comparative Example 4

A molded article was prepared in the same manner as in Example 1, except that the reinforcing fiber [B-1] was 50 parts by weight and the thermoplastic resin [A-1] was 47.0 parts by weight relative to total 100 parts by weight of the ingredients [A] to [C], and evaluation was made. The evaluation results are shown in Table 2.

Comparative Example 5

A molded article was prepared in the same manner as in Example 1 except that the reinforcing fiber modifier [C-1] was 0 part by weight, the thermoplastic resin [F-1] was 2.0 parts by weight, and the thermoplastic resin [A-1] was 90.0 parts by weight relative to total 100 parts by weight of the ingredients [A] to [C], and evaluation was made. The evaluation results are shown in Table 2.

Comparative Example 6

A resin impregnated fiber filament [E] obtained by impregnating the aforementioned reinforcing fiber (B-1) filament with the resin (D-1) at a ratio shown in Table 2, and the thermoplastic resin (A-1) were supplied to TEX-30α type twin-screw extruder (screw diameter of 30 mm, L/D=32) manufactured by The Japan Steel Works, Ltd., and melt-kneaded at a screw speed of 200 rpm. A strand discharged from the die tip was cooled and solidified, and then cut with a cutter into a pellet having length of 7 mm to prepare a fiber-containing melt-kneaded pellet. At this time, adjustment was performed such that the thermoplastic resin (A-1) was 87.0 parts by weight, the reinforcing fibers (B) was 10 parts by weight, and the reinforcing fiber modifier (C-1) was 3.0 parts by weight relative to total 100 parts by weight of the ingredients (A) to (C).

The obtained fiber-containing melt-kneaded pellet was injection-molded under conditions of injection time: 10 seconds, backpressure: 10 MPa, holding time: 10 seconds, cylinder temperature: 300° C., and mold temperature: 100° C. by using SE75DUZ-C250 type injection molding machine manufactured by Sumitomo Heavy Industries, Ltd. to prepare an ISO tensile dumbbell test piece, a test piece having a size of 80 mm×80 mm×3 mm in thickness, and a test piece having a size of 80 mm×10 mm×4 mm in thickness. The cylinder temperature indicates a temperature of a part of the injection molding machine where the molding material is heat-melted, and the mold temperature indicates a temperature of a mold to which a resin to form a predetermined shape is injected. Each of the obtained test pieces was placed still for 24 hours in a thermos-hygrostat chamber adjusted to have a temperature of 23° C. and 50% RH, and then evaluated by the above method. The evaluation results are shown in Table 2.

TABLE 1

|  |  |  |  | Example 1 | Example 2 | Example 3 | Example 4 | Example 5 | Example 6 | Example 7 |
|---|---|---|---|---|---|---|---|---|---|---|
| Raw Materials | Thermo- plastic Resin [A] | Type | — | A-1 | A-1 | A-1 | A-1 | A-1 | A-1 | A-1 |
|  |  | Solubility Parameter | — | 12 | 12 | 12 | 12 | 12 | 12 | 12 |
|  |  | Blending Amount | parts by weight | 87.0 | 89.5 | 85.0 | 87.0 | 87.0 | 75.0 | 87.0 |

TABLE 1-continued

|  |  |  |  |  |  |  |  |  |  |  |
|---|---|---|---|---|---|---|---|---|---|---|
|  | Reinforcing Fiber [B] | Type | — | B-1 | B-1 | B-1 | B-1 | B-1 | B-1 | B-1 |
|  |  | Solubility Parameter | — | 10 | 10 | 10 | 10 | 10 | 10 | 10 |
|  |  | Blending Amount | parts by weight | 10.0 | 10.0 | 10.0 | 10.0 | 10.0 | 10.0 | 10.0 |
|  | Reinforcing Fiber Modifier [C] | Type | — | C-1 | C-1 | C-1 | C-1 | C-2 | C-1 | C-1 |
|  |  | Solubility Parameter | — | 9 | 9 | 9 | 9 | 9 | 9 | 9 |
|  |  | Blending Amount | parts by weight | 3.0 | 0.5 | 5.0 | 3.0 | 3.0 | 15 | 3.0 |
|  | Resin [D] | Type | — | D-1 | D-1 | D-1 | D-1 | D-1 | D-1 | D-1 |
|  |  | Blending Amount | parts by weight | 2.6 | 2.6 | 2.6 | 2.6 | 2.6 | 2.6 | 2.6 |
|  | Thermo-Plastic Resin [F] | Type | — | — | — | — | — | — | — | F-1 |
|  |  | Parts by weight | parts by weight | — | — | — | — | — | — | 2.0 |
|  | Thermally Conductive Filler [G] | Type | — | — | — | — | — | — | — | — |
|  |  | Parts by Weight | parts by weight | — | — | — | — | — | — | — |
|  | Long-Fiber Pellet | Type | — | — | — | — | — | — | — | — |
|  |  | Parts by Weight | parts by weight | — | — | — | — | — | — | — |
|  | Resin Molding Material | Type | — | — | — | — | — | — | — | — |
|  |  | Parts by Weight | parts by weight | — | — | — | — | — | — | — |
| Molded Article | Exposed Fiber Length | $L_B$ (Measured Value) | Mm | 0.6 | 0.3 | 0.7 | 0.2 | 0.5 | 0.4 | 0.9 |
|  | Weight-Average Fiber Length | $L_W$ (Measured Value) | Mm | 1.0 | 0.6 | 1.2 | 0.6 | 0.9 | 0.7 | 1.2 |
|  | Reinforcing Fiber Modifier [C] Adhesion Ratio |  | % | 80 | 50 | 85 | 40 | 70 | 100 | 80 |
|  | Reinforcing Fiber Modifier [C] Film Thickness |  | Nm | 15 | 10 | 20 | 15 | 10 | 15 | 15 |
|  | Fiber Dispersibility |  | — | A | A | A | A | A | A | A |
| Physical Properties Evaluation | Charpy Impact Strength |  | kJ/m² | 20 | 14 | 23 | 14 | 17 | 20 | 22 |
|  | Bending Strength |  | MPa | 120 | 140 | 90 | 120 | 130 | 40 | 100 |
|  | Bending Modulus |  | GPa | 10 | 10 | 10 | 10 | 10 | 10 | 10 |

|  |  |  |  | Example 8 | Example 9 | Example 10 | Example 11 | Example 12 | Example 13 |
|---|---|---|---|---|---|---|---|---|---|
| Raw Materials | Thermoplastic Resin [A] | Type | — | A-1 | A-1 | A-1 | A-1 | A-2 | A-3 |
|  |  | Solubility Parameter | — | 12 | 12 | 12 | 12 | 15 | 9 |
|  |  | Blending Amount | parts by weight | 87.0 | 90.0 | 87.0 | 87.0 | 87.0 | 87.0 |
|  | Reinforcing Fiber [B] | Type | — | B-1 | B-1 | B-1 | B-1 | B-1 | B-1 |
|  |  | Solubility Parameter | — | 10 | 10 | 10 | 10 | 10 | 10 |
|  |  | Blending Amount | parts by weight | 10.0 | 10.0 | 10.0 | 10.0 | 10.0 | 10.0 |
|  | Reinforcing Fiber Modifier [C] | Type | — | C-1 | — | C-1 | C-1 | C-1 | C-3 |
|  |  | Solubility Parameter | — | 9 | — | 9 | 9 | 9 | 12 |
|  |  | Blending Amount | parts by weight | 3.0 | — | 3.0 | 3.0 | 3.0 | 3.0 |
|  | Resin [D] | Type | — | — | D-1 | D-1 | D-1 | — | — |
|  |  | Blending Amount | parts by weight | — | 2.6 | 2.6 | 2.6 | — | — |
|  | Thermo-Plastic Resin [F] | Type | — | — | — | F-1 | F-1 | — | — |
|  |  | Parts by weight | parts by weight | — | — | 2.0 | 2.0 | — | — |

TABLE 1-continued

| | | | | | | | | | |
|---|---|---|---|---|---|---|---|---|---|
| | Thermally Conductive Filler [G] | Type<br>Parts by Weight | —<br>parts by weight | —<br>— | —<br>— | G-1<br>25.0 | G-1<br>25.0 | —<br>— | —<br>— |
| | Long-Fiber Pellet | Type<br>Parts by Weight | —<br>parts by weight | — | — | — | (X-1)<br>(50.0) | — | — |
| | Resin Molding Material | Type<br>Parts by Weight | —<br>parts by weight | — | — | — | (Y-1)<br>(50.0) | — | — |
| Molded Article | Exposed Fiber Length | $L_B$ (Measured Value) | Mm | 0.4 | 0.3 | 1.0 | 0.6 | 0.4 | 0.6 |
| | Weight-Average Fiber Length | $L_W$ (Measured Value) | Mm | 0.6 | 1.0 | 1.4 | 1.0 | 0.8 | 1.1 |
| | Reinforcing Fiber Modifier [C] Adhesion Ratio | | % | 80 | — | 80 | 70 | 90 | 80 |
| | Reinforcing Fiber Modifier [C] Film Thickness | | Nm | 15 | — | 15 | 12 | 15 | 10 |
| | Fiber Dispersibility | | — | B | A | A | A | B | B |
| Physical Properties Evaluation | Charpy Impact Strength | | kJ/m² | 11 | 13 | 19 | 19 | 17 | 13 |
| | Bending Strength | | MPa | 100 | 150 | 100 | 110 | 140 | 80 |
| | Bending Modulus | | GPa | 10 | 10 | 14 | 10 | 9 | 9 |

TABLE 2

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Raw Materials | Thermoplastic Resin [A] | Type | — | A-1 | A-1 | A-1 | A-1 | A-1 | A-1 |
| | | Solubility Parameter | — | 12 | 12 | 12 | 12 | 12 | 12 |
| | | Blending Amount | parts by weight | 90.0 | 87.0 | 96.5 | 47.0 | 90.0 | 87.0 |
| | Reinforcing Fiber [B] | Type | — | B-1 | B-1 | B-1 | B-1 | B-1 | B-1 |
| | | Solubility Parameter | — | 10 | 10 | 10 | 10 | 10 | 10 |
| | | Blending Amount | parts by weight | 10.0 | 10.0 | 0.5 | 50.0 | 10.0 | 10.0 |
| | Reinforcing Fiber Modifier [C] | Type | — | — | C-3 | C-1 | C-1 | — | C-1 |
| | | Solubility Parameter | — | — | 12 | 9 | 9 | — | 9 |
| | | Blending Amount | parts by weight | — | 3.0 | 3.0 | 3.0 | — | 3.0 |
| | Resin [D] | Type | — | D-1 | D-1 | D-1 | D-1 | D-1 | D-1 |
| | | Blending Amount | parts by weight | 2.6 | 2.6 | 2.6 | 14.3 | 2.6 | 2.6 |
| | Thermoplastic Resin [F] | Type | — | — | — | — | — | F-1 | F-1 |
| | | Blending Amount | parts by weight | — | — | — | — | 2.0 | 2.0 |
| Molded Article | Exposed Fiber Length | $L_B$ (Measured Value) | mm | <0.1 | <0.1 | <0.1 | <0.1 | <0.1 | <0.1 |
| | Weight-Average Fiber Length | $L_W$ (Measured Value) | mm | 0.4 | 0.4 | 0.2 | 0.1 | 0.4 | 0.2 |
| | Reinforcing Fiber Modifier [C] Adhesion Ratio | | % | — | <5 | 60 | 60 | — | 100 |
| | Reinforcing Fiber Modifier [C] Film Thickness | | nm | — | <5 | <5 | 10 | — | 10 |
| | Fiber Dispersibility | | — | A | A | A | C | A | A |
| Physical Properties Evaluation | Charpy Impact Strength | | kJ/m² | 8 | 7 | 5 | 9 | 9 | 8 |
| | Bending Strength | | MPa | 150 | 140 | 45 | 120 | 160 | 50 |
| | Bending Modulus | | GPa | 10 | 10 | 2 | 40 | 10 | 9 |

All materials of Examples 1 to 13 exhibited excellent dispersibility and excellent impact strength. Regarding Example 7 in which the thermoplastic resin [F] was blended, an effect of improving the impact strength was confirmed by comparison with Example 1. Moreover, Example 10 in which the thermally conductive filler [G] was blended exhibited an excellent thermal conductivity characteristic and an excellent bending characteristic by comparison with Example 7.

On the other hand, regarding Comparative Example 1 in which no reinforcing fiber modifier [C] was added, the exposed fiber length and weight-average fiber length of the reinforcing fibers [B] were small, and the impact strength was low. Regarding Comparative Example 2 in which the reinforcing fiber modifier [C] having a small difference in solubility parameter value from the thermoplastic resin [A] was used, the exposed fiber length and weight-average fiber length of the reinforcing fibers [B] were also small, and the impact strength was also low. Regarding Comparative Example 3 in which the blending amount of the reinforcing fibers [B] was small and furthermore the backpressure at the time of injection molding was high, the weight-average fiber length and exposed fiber length of the reinforcing fibers [B] were also small, and the reinforcing effect by the reinforcing fibers [B] was also low, leading to low impact strength. Regarding Comparative Example 4 in which the blending amount of the reinforcing fibers [B] was large, fiber interlacing at the time of injection molding increased, the weight-average fiber length and exposed fiber length of the reinforcing fibers [B] were small, and the impact strength was low. Regarding Comparative Example 5 in which no reinforcing fiber modifier [C] was added but the thermoplastic resin [F] was blended, the exposed fiber length was small, and the impact strength was low. Regarding Comparative Example 6 in which a molding material prepared by melt kneading was used, the weight-average fiber length of the reinforcing fibers [B] in the molded article was small, and therefore the exposed fiber length was also small and the impact strength lowered.

INDUSTRIAL APPLICABILITY

The fiber reinforced thermoplastic resin molded article has excellent impact strength so that it can be developed for various uses. The molded article is especially useful for various components and members such as a component, an internal member and a housing of electrical and electric equipment, OA equipment, household electrical appliance, an automobile or the like.

The invention claimed is:
1. A fiber reinforced thermoplastic resin molded article comprising:
   a thermoplastic resin [A];
   carbon fiber reinforcing fibers [B]; and
   a reinforcing fiber modifier [C] having a melt viscosity at 200° C. lower than a melt viscosity of the thermoplastic resin [A], wherein
   a difference in solubility parameter value between the reinforcing fiber modifier [C] and the thermoplastic resin [A] is equal to or larger than 1.0,
   a difference in solubility parameter value between the reinforcing fiber modifier [C] and a surface of the carbon fiber reinforcing fibers [B] is smaller than the difference in solubility parameter value between the reinforcing fiber modifier [C] and the thermoplastic resin [A],
   the molded article comprises 50 to 98.9 parts by weight of the thermoplastic resin [A]; 1 to 40 parts by weight of the carbon fiber reinforcing fiber [B]; and 0.1 to 10 parts by weight of the reinforcing fiber modifier [C] relative to total 100 parts by weight of the thermoplastic resin [A], the carbon fiber reinforcing fibers [B], and the reinforcing fiber modifier [C], and
   a weight-average fiber length (Lw) of the carbon fiber reinforcing fibers [B] in the molded article is 0.3 to 4 mm.
2. The fiber reinforced thermoplastic resin molded article according to claim 1, wherein a difference in solubility parameter value between the thermoplastic resin [A] and the reinforcing fiber modifier [C] is equal to or larger than 2.5.
3. The fiber reinforced thermoplastic resin molded article according to claim 1, wherein the weight-average fiber length (Lw) of the carbon fiber reinforcing fibers [B] is 0.5 to 2.5 mm.

* * * * *

UNITED STATES PATENT AND TRADEMARK OFFICE
CERTIFICATE OF CORRECTION

PATENT NO. : 10,385,174 B2
APPLICATION NO. : 15/329864
DATED : August 20, 2019
INVENTOR(S) : Hirata et al.

Page 1 of 1

It is certified that error appears in the above-identified patent and that said Letters Patent is hereby corrected as shown below:

On the Title Page

At (30) Foreign Application Priority Data, add --Dec. 8, 2014 (JP) 2014-247560-- and --Aug. 6, 2014 (JP) 2014-159967--.

Signed and Sealed this
Fifth Day of May, 2020

Andrei Iancu
*Director of the United States Patent and Trademark Office*